United States Patent
Dunn

(10) Patent No.: US 12,533,625 B2
(45) Date of Patent: Jan. 27, 2026

(54) SYSTEM AND METHOD OF $CO_2$ THERMAL SWING ADSORPTION WITH WET REGENERATION AND HOT DRYING

(71) Applicant: Enhanced Energy Group LLC, West Kingston, RI (US)

(72) Inventor: Paul M. Dunn, West Kingston, RI (US)

(73) Assignee: Enhanced Energy Group LLC, West Kingston, RI (US)

(*) Notice: Subject to any disclaimer, the term of this patent is extended or adjusted under 35 U.S.C. 154(b) by 382 days.

(21) Appl. No.: 18/361,203

(22) Filed: Jul. 28, 2023

(65) Prior Publication Data

US 2024/0058741 A1 Feb. 22, 2024

Related U.S. Application Data

(60) Provisional application No. 63/371,899, filed on Aug. 19, 2022.

(51) Int. Cl.
*B01D 53/04* (2006.01)
*B01D 53/14* (2006.01)
*B01D 53/26* (2006.01)

(52) U.S. Cl.
CPC ..... *B01D 53/0462* (2013.01); *B01D 53/1475* (2013.01); *B01D 53/261* (2013.01);
(Continued)

(58) Field of Classification Search
CPC B01D 53/04; B01D 53/0462; B01D 53/1475; B01D 53/261; B01D 2253/102;
(Continued)

(56) References Cited

U.S. PATENT DOCUMENTS 3,594,983 A * 7/1971 Yearout ............... B01D 53/047
95/122
5,061,455 A * 10/1991 Brose .................... B01D 53/04
423/230

(Continued)

FOREIGN PATENT DOCUMENTS

EP 1058074 12/2000
EP 2468384 A1 6/2012
(Continued)

OTHER PUBLICATIONS

Written Opinion and International Search Report for Int'l. Patent Appln. No. PCT/US2023/072057, mailed Jan. 4, 2024 (14 pgs).
(Continued)

*Primary Examiner* — Frank M Lawrence, Jr.

(57) ABSTRACT

A capture vessel is provided that is configured to capture carbon dioxide ($CO_2$) according to a thermal swing adsorption (TSA) process. The capture vessel includes capture media that are configured to adsorb $CO_2$ from an exhaust gas during a $CO_2$ capture stage to produce a first $N_2$ gas that exits the capture vessel, receive a mixed stream of $CO_2$ and water vapor during a wet regeneration stage, adsorb water from the mixed stream of $CO_2$ and water vapor and release adsorbed $CO_2$ during the wet regeneration stage to produce a $CO_2$ stream, receive a first heated $N_2$ gas and release adsorbed water due to evaporation caused by the first heated $N_2$ gas during a drying stage, and receive a cooled gas during a cooling stage such that an absorption capacity of the capture media for $CO_2$ capture is increased for a next $CO_2$ capture stage.

11 Claims, 21 Drawing Sheets

(52) U.S. Cl.
CPC .... *B01D 2253/102* (2013.01); *B01D 2256/10* (2013.01); *B01D 2257/504* (2013.01); *B01D 2258/01* (2013.01); *B01D 2259/40083* (2013.01); *B01D 2259/652* (2013.01)

(58) Field of Classification Search
CPC .......... B01D 2256/10; B01D 2257/504; B01D 2258/01; B01D 2259/40083; B01D 2259/652
USPC .... 96/121, 126–128, 130, 146; 95/114, 115, 95/139
See application file for complete search history.

(56) References Cited

U.S. PATENT DOCUMENTS

| | | |
|---|---|---|
| 8,424,515 B1 | 4/2013 | Maccallum |
| 9,194,340 B2 | 11/2015 | Dunn |
| 9,295,939 B2 | 3/2016 | Jain |
| 9,314,731 B2 | 4/2016 | Chen et al. |
| 10,080,991 B2 | 9/2018 | Johnson et al. |
| 10,584,633 B2 | 3/2020 | Dunn |
| 11,111,847 B2 | 9/2021 | Dunn |
| 11,224,834 B2 | 1/2022 | Boulet et al. |
| 11,344,838 B2 | 5/2022 | Joss et al. |
| 2005/0139072 A1 | 6/2005 | Landrum et al. |
| 2008/0289497 A1 | 11/2008 | Barclay et al. |
| 2015/0007727 A1 | 1/2015 | Elliott et al. |
| 2020/0232386 A1 | 7/2020 | Dunn |
| 2021/0187438 A1* | 6/2021 | Nishibe .................. B01D 53/83 |
| 2022/0072470 A1 | 3/2022 | Dunn |
| 2024/0017202 A1* | 1/2024 | Cirucci .............. B01D 53/0446 |
| 2024/0058740 A1* | 2/2024 | Dunn ................ B01D 53/1475 |
| 2024/0058742 A1* | 2/2024 | Dunn .................... B01D 53/261 |

FOREIGN PATENT DOCUMENTS

| | | |
|---|---|---|
| GB | 2281229 A | 3/1995 |
| WO | 2022122472 A1 | 6/2022 |

OTHER PUBLICATIONS

Written Opinion and International Search Report for Int'l. Patent Appln. No. PCT/US2023/072054, mailed Nov. 15, 2023 (13 pgs).

* cited by examiner

Capture Process, Three Bed TSA

SYSTEM AND METHOD OF $CO_2$ THERMAL SWING ADSORPTION WITH WET REGENERATION AND HOT DRYING

CROSS-REFERENCE TO RELATED APPLICATION

This patent application claims priority to U.S. Provisional Patent Application No. 63/371,899, filed on Aug. 19, 2022. The disclosure of the prior application is considered part of and is incorporated by reference into this patent application.

TECHNICAL FIELD

The present disclosure relates generally to carbon capture and thermal swing adsorption (TSA) processes for carbon capture.

BACKGROUND

Molecular (mole) sieves include synthetic media (e.g., ceramic-like media), available in various physical sizes (powder to ¼ inch round). Based on a composition and crystal structure of the synthetic media, mole sieves are capable of adsorbing, or not adsorbing, particular species of molecule based mostly on a size of the molecule. For example, a 3A sieve will adsorb water ($H_2O$), ammonia (NH3), and little else. Molecules like $CO_2$, $O_2$, $N_2$, and argon would pass through the 3A sieve. The 3A sieve (and alumina) are typically used in dehydration processes. A 5A sieve will adsorb all of the species of the 3A but will also adsorb $CO_2$ and most pollutants (CO, HC, NOx) while allowing $O_2$, $N_2$, and argon to pass through the 5A sieve. A 13X sieve captures larger molecules, including many hydrocarbons, but still allows $O_2$, $N_2$, and argon to pass through the 13X sieve. When a mole sieve is cold and a partial pressure of a desired species is high, the mole sieve will adsorb the desired species. The mole sieve will release the desired species when a temperature is increased, and/or the partial pressure is lowered. Hence, the terms pressure swing, thermal swing, vacuum swing, or combinations of the swing processes are used to describe the capture and release of the desired species by the mole sieve. However, the swing processes are inefficient in terms of electrical power required to perform the swing processes to sufficiently capture and release $CO_2$, which increases costs.

Activated carbon behaves similarly to mole sieves, and can be used in lieu of mole sieves in some cases. However, activated carbon has a different affinity for compounds that is not based on molecule size. Using activated carbon is higher in cost and lower in performance in terms of $CO_2$ capture compared with mole sieves, but has advantages of a lower heat of adsorption for water (e.g., about 1000 BTU/lb for activated carbon vs. about 1800 BTU/lb for mole sieves) and a lower heat of adsorption for $CO_2$.

The carbon capture system of the present disclosure solves one or more of the problems set forth above and/or other problems in the field.

SUMMARY

In some implementations, a capture vessel configured to capture carbon dioxide ($CO_2$) according to a thermal swing adsorption (TSA) process includes capture media arranged inside the capture vessel, wherein the capture media are configured to adsorb $CO_2$ from an exhaust gas during the $CO_2$ capture stage to produce a first $N_2$ gas that exits the capture vessel, receive a mixed stream of $CO_2$ and water vapor during the wet regeneration stage, adsorb water from the mixed stream of $CO_2$ and water vapor and release adsorbed $CO_2$ during the wet regeneration stage to produce a $CO_2$ stream, receive a first heated $N_2$ gas and release adsorbed water due to evaporation caused by the first heated $N_2$ gas during the drying stage, and receive a cooled gas during the cooling stage such that an absorption capacity of the capture media for $CO_2$ capture is increased for a next $CO_2$ capture stage, wherein the adsorbed $CO_2$ is adsorbed during the $CO_2$ capture stage, and wherein the adsorbed water is adsorbed during the wet regeneration stage.

In some implementations, a method of performing a $CO_2$-TSA process for carbon capture includes dynamically configuring a carbon capture system comprising a plurality of capture vessels, arranged in parallel, into different fluid path configurations to perform the $CO_2$-TSA process, wherein the $CO_2$-TSA process includes a cyclical sequence for each capture vessel of the plurality of capture vessels, and wherein the cyclical sequence includes a $CO_2$ capture stage, followed by a wet regeneration stage, followed by a drying stage, followed by a cooling stage; performing the $CO_2$ capture stage for a first capture vessel of the plurality of capture vessels; performing the wet regeneration stage for a second capture vessel of the plurality of capture vessels in parallel with the $CO_2$ capture stage of the first capture vessel; and performing the drying stage for a third capture vessel of the plurality of capture vessels in parallel with the $CO_2$ capture stage of the first capture vessel.

DETAILED DESCRIPTION

This disclosure relates to carbon capture, which is applicable to any machine, system, or plant that uses a combustion engine, such as a piston engine or a turbine engine. For example, the disclosure relates to a $CO_2$ thermal swing adsorption (TSA) process with improved performance using $CO_2$ and a $CO_2$-turbocharger to drive the thermal swing adsorption process with reduced or zero electrical power. Carbon capture systems and methods of carbon capture are provided, which are applicable in general to distributed power applications in a 1-40 megawatt (MW) range, which uses a $CO_2$-TSA process, designed with a semi-closed cycle (SCC), but also applicable to other raw $CO_2$ sources. The carbon capture systems and methods use exhaust waste heat as part of the $CO_2$-TSA process, and use thermal sinks and mixed water vapor and dry gas for improved $CO_2$ capture.

The carbon capture systems and methods may provide as least one of the following benefits, including: (1) lower the cost of carbon capture in small distributed applications, generally between 1 and 40 MW per engine, targeting $CO_2$ associated with semi-closed cycle techniques (e.g., a process that uses a combination of cooled exhaust recirculation and oxygen augmentation for reciprocating piston engines and/or gas turbine engines), but also applicable to other sources; (2) enable a use of high performance molecular sieves, in a TSA process, in a manner which does not dilute a purity of or reduce a capture efficiency of the $CO_2$; (3) substantially reduce electrical and/or mechanical loads associated with the carbon capture; (4) improve a construction of TSA vessels to lower the cost of carbon capture and to minimize performance issues associated with leakage; (5) mitigate other pollutants, such as NOx, Sox, CO, HC; and (6) provide a solution suitable for new construction or retrofit application at lower cost.

The carbon capture systems and methods target dilute $CO_2$ streams (3-11% $CO_2$ content) that exist in distributed power to gas turbines, lean burn piston engines (spark or compression ignited), and rich burn piston engines, with or without exhaust concentration of the SCC. The carbon capture systems and methods may improve regeneration performance in $CO_2$-TSA, reducing a time for regeneration and improving a percentage of carbon captured. The improved regeneration performance in $CO_2$-TSA may be accomplished via a use of a water vapor and $CO_2$ mixture to provide both heat and a purge/displacement effect, which are created in a unique way. Additionally, some implementations, may include an $N_2$-turbo component to improve dehydration. A management of temperatures at a machinery inlet (e.g., at the $CO_2$-turbocharger) may also be improved and new methods to reduce NOx and SOx are disclosed. Finally, adsorption performance may be improved via improved cooling.

Figure 1:
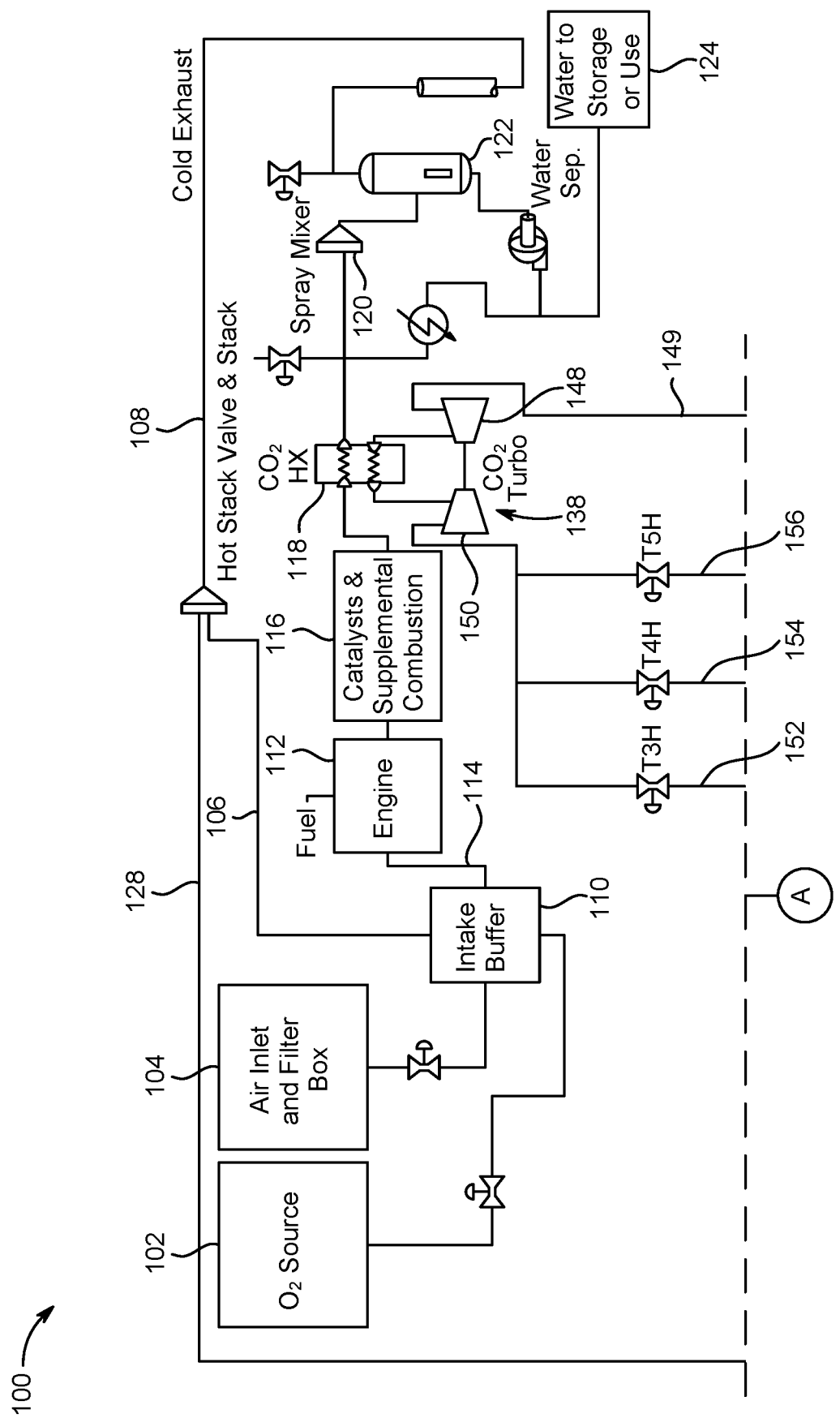
FIG. 1 illustrates a carbon capture system according to one or more implementations.
Figure 1:
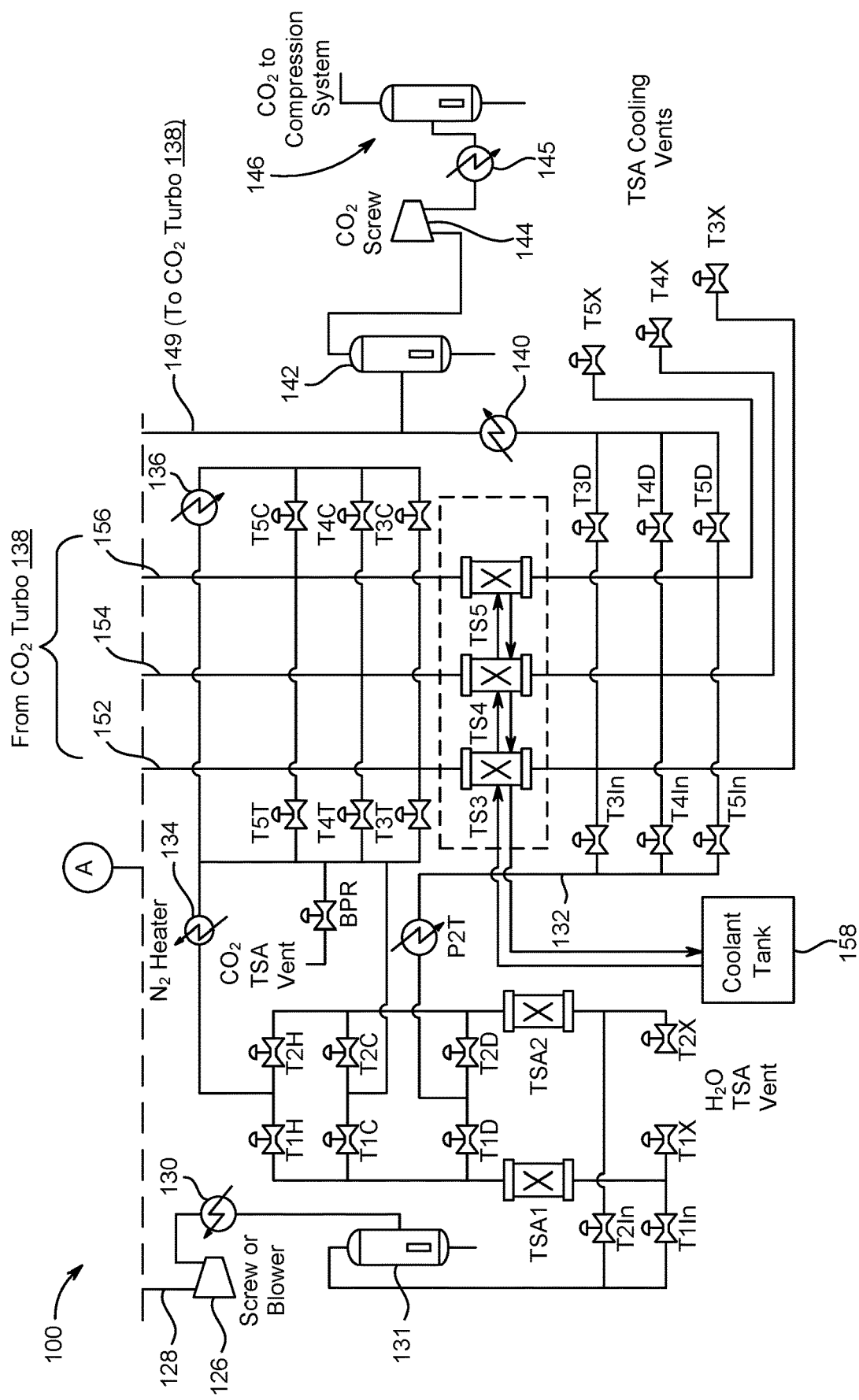

FIG. 1 illustrates a carbon capture system 100 according to one or more implementations. The carbon capture system 100 includes components for a $CO_2$-TSA processes with a semi-closed cycle. The components may be interconnected by a plurality of manifolds that may be configured to carry one or more fluids (e.g., liquids, gases, or gas-liquid mixtures).

The carbon capture system 100 may include an $O_2$ source 102 (e.g., an $O_2$ plant) that provides $O_2$, an air inlet and filter box 104 that provides air, an SCC path 106 that is used to provide a portion of cooled exhaust from an exhaust return path 108, an intake buffer tank 110, and an engine 112. As is the case with any combustion engine, fuel is combusted, and that combustion requires an oxidizer, which is generally air. The engine 112 (e.g., a turbine engine, piston engine) may draw in a working fluid 114 from the intake buffer tank 110. In some implementations, the engine 112 may be another type of exhaust source. The working fluid 114 used as an artificial atmosphere may be a mixture of air, oxygen, and cooled exhaust. A mixed concentration of oxygen in the intake buffer tank is a variable, but generally falls in the range of 12-22% $O_2$. The engine 112 combusts the fuel in the artificial atmosphere to produce a hot exhaust (e.g., a hot flue gas). The hot exhaust may flow through optional catalysts and supplemental combustion (block 116) to an exhaust heat exchanger (e.g., $CO_2$ heat exchanger ($CO_2$ HX) 118 or chiller 615). The exhaust heat exchanger partially cools the hot exhaust (e.g., to about 400° F.). The partially cooled exhaust is then mixed with colder water by a spray mixer 120, which quenches the partially cooled exhaust down to about 100° F. As a result, most of the water from combustion products in the exhaust condenses, and the condensed water is removed in a gas-liquid separator 122 (e.g., a direct contact cooler (DCC)). The condensed water accumulates in a water storage tank 124 unless the condensed water is otherwise used or disposed of. For example, the condensed water may be used as make-up water in a cooling tower, eliminating or reducing a problem of water disposal.

The cooled exhaust (e.g., cold exhaust), now depleted of most of the water, returns to the intake buffer tank 110 via the SCC path 106 or to a TSA screw/blower 126 (fan) via a TSA path 128. The SCC path 106 is part of an SCC exhaust loop that starts at the intake buffer tank 110, proceeds through the gas-liquid separator 122 to the exhaust return path 108, and returns back through the SCC path to the intake buffer tank 110. The SCC is used to increase $CO_2$ concentration for an adsorption bed (e.g., for capture vessels TS3, TS4, and TS5) via exhaust recirculation.

A flowrate at the TSA screw/blower 126, which may be a variable speed drive or may include other methods of flow regulation, indirectly sets a level of exhaust recirculation, since an engine flowrate is essentially fixed. Thus, $CO_2$ that is not removed by the carbon capture system 100 may be recirculated, and a balance of the artificial atmosphere at the engine will be made up by air and/or oxygen.

Downstream of the TSA screw/blower 126 is a network of interconnected components that are responsible for performing the carbon capture via a $CO_2$-TSA process. Immediately downstream of the TSA screw/blower 126 is a heat exchanger/chiller 130, typically cooling the cold exhaust to 35-50° F., which will cause more water present in the cold exhaust to condense, reducing a load on molecular sieves that follow. A tank 131 may be connected immediately downstream from the heat exchanger/chiller 130 to separate the water from the cold exhaust.

Valves T1In, T2In, T1X, T2X, T1D, T2D, T1C, T2C, T1H, T2H, T3In, T4In, T5In, T3D, T4D, T5D, T3X, T4X, T5X, T3T, T4T, T5T, T3C, T4C, T5C, T3H, T4H, T5H, and BPR are used to control a flow of one or more fluids throughout the carbon capture system 100. An open state and a closed state of each of the valves may be controlled by a controller (not illustrated) according to one or more process stages of the $CO_2$-TSA process. For example, three capture vessels TS3, TS4, or TS5 may be arranged in parallel, and the valves may be controlled such that a process stage at each one of the three capture vessels TS3, TS4, or TS5 (e.g., $CO_2$ capture vessels) is controlled based on a batch sequence of the $CO_2$-TSA process. For example, the valves may be controlled such that the capture vessel TS3 is in an adsorption stage (e.g., a capture stage), while the capture vessel TS4 is in a cooling stage and the capture vessel TS4 is a regeneration stage. The valves may further be controlled such that the capture vessel TS4 in in an adsorption stage (e.g., a capture stage), while the capture vessel TSA5 is in a cooling stage and the capture vessel TSA3 is a regeneration stage. The valves may further be controlled such that the capture vessel TS5 in an adsorption stage (e.g., a capture stage), while the capture vessel TSA3 is in a cooling stage and the capture vessel TS4 is a regeneration stage. The batch sequence may then be repeated.

In some implementations, the capture vessels TS3, TS4, or TS5 may be referred to as "beds." Each capture vessel TS3, TS4, and TS5 may include media (e.g., capture media) that is configured to capture or adsorb $CO_2$. In some cases, the media may also adsorb water.

A first step in the $CO_2$-TSA process is a water dehydration process carried out by a blend of alumina and a 3A mole sieve in adsorbent vessels TSA1 and TSA2. The water dehydration process is a batch type process. Thus, when one adsorbent vessel TSA1 or TSA2 is adsorbing water, the other adsorbent vessel TSA1 or TSA2 is off-line, either being heated or being cooled. Valves TIM and T2In control which adsorbent vessel TSA1 or TSA2 is receiving the cold exhaust from the heat exchanger/chiller 130. For description purposes, assuming adsorbent vessel TSA1 is dehydrating, then valve TIM is open, and the cold exhaust flows through the adsorbent vessel TSA1 and out valve T1D, through another cooler P2T, to one of the capture vessels TS3, TS4, or TS5 for carbon capture. At an adsorption inlet 132 of the capture vessels TS3, TS4, and TS5, the cold exhaust has essentially zero water, and is typically composed of 5-20% $CO_2$, 0-10% $O_2$, and a balance inert mixture (e.g., nitrogen, with a little argon).

Assuming the capture vessel TS3 is at this point adsorbing $CO_2$, valve T3In will be open, with valves T4In and T5In closed. The exhaust gas, now depleted of $CO_2$ via the capture vessel TS3 and water via one of the adsorbent vessels TSA1 and TSA2, flows out of the capture vessel TS3 via valve T3T, which is open, while valves T4T and T5T are closed. The exhaust gas flowing out of the capture vessel TS3 is a relatively warm dry gas having a temperature around 80-160° F., and is composed mostly of $N_2$ gas. The exhaust gas flowing out of the capture vessel TS3 flows out of the capture vessel TS3 and through the valve T3T and may be manifolded to several locations. For simplicity, this relatively warm dry gas that flows out of the capture vessel performing $CO_2$ adsorption (e.g., capture vessel TS3) may be referred to as a dry $N_2$ gas or depleted flue gas.

If all downstream valves are closed, or if a backpressure for some reason is too high, any excess dry $N_2$ gas will be discharged to atmosphere via a $CO_2$ TSA vent, controlled by a back pressure regulator of the valve BPR. Generally, the backpressure is lower than a setpoint of the back pressure regulator and the valve BPR remains closed.

A portion of the dry $N_2$ gas may be used to heat either adsorbent vessel TSA1 or TSA2 (e.g., whichever adsorbent vessel is not adsorbing water, in this example adsorbent vessel TSA2), or to cool TSA2, depending on a cycle time. During a heating process of one of the adsorbent vessels TSA1 or TSA2, the dry $N_2$ gas may be directed through an $N_2$ heater 134 (e.g., a heat exchanger) by opening one of the valves T1H or T2H and closing both valves T1C and T2C. During a cooling process of one of the adsorbent vessels TSA1 or TSA2, the dry (warm) $N_2$ gas may be directed from the valve T3T to bypass the $N_2$ heater 134 by opening one of the valves T1C or T2C and closing both valves T1H and T2H.

For example, if a design point is 8 hours for water adsorption (dehydration) in the adsorbent vessel TSA1 and the adsorbent vessel TSA2, then the adsorbent vessel TSA1 would be set for adsorbing water for 8 hours, and, in parallel, the adsorbent vessel TSA2 would be first set for regeneration (heated) by opening valves T2H and T2X, using the heated dry $N_2$ from the $N_2$ heater 134, for about 4 hours, and then would be cooled, for about 4 hours, by opening valve T2C, while closing valve T2H with valve T2X still open. After 8 hours this process would reverse, with TSA2 taking over the adsorption (dehydration) duty, and with TSA1 being heated, then cooled, via combinations of valve actions at T1H, T1C, and T1X. The cycle time for water adsorption is typically several hours, generally between 3 and 12 hours.

After chilling and condensation, there is in most cases an order of magnitude more $CO_2$ in the exhaust than water in the exhaust, and the capacity for $CO_2$ per unit weight of mole sieve is lower than that of water. As a result, cycle times for $CO_2$ adsorption in the capture vessels TS3, TS4, and TS5 are measured in minutes, not hours. Assuming the capture vessel TS3 is adsorbing $CO_2$ (e.g., valves T3In and T3T are open), a portion of the dry $N_2$ gas that exits the capture vessel TS3 via valve T3T, optionally further cooled via a heat exchanger/chiller 136, can pass through valve T4C to provide cooling to the capture vessel TS4, and can exit via valve T4X. It is noted that the volume of gas required for cooling may not be met fully by the flow rate coming from the capture vessel TS3, and methods to augment the flow via recirculation or mitigate the amount of flow needed are described below.

After the $CO_2$ adsorption cycle is complete (e.g., in capture vessel TS3), the captured $CO_2$ must be released during the regeneration stage. In a TSA process, releasing captured $CO_2$ is done mostly via heating. In the present disclosure, that heating is provided by a hot gas mixture, which is mostly hot $CO_2$ in this example delivered via valve T3H to the capture vessel TS3. The hot $CO_2$ is generally at 600-800° F. The hot $CO_2$ gas flows downward from a $CO_2$-turbocharger 138, through valve T3H, and through the media in the capture vessel TS3, which gradually heats the media, and drives off more $CO_2$. Warm $CO_2$ exits the capture vessel TS3 and flows via valve T3D to a cooler 140 (e.g., a heat exchanger), and a portion of the $CO_2$ gas splits off, flowing through a separator 142 (in theory unneeded, this being dry gas, it is really there to add volume to improve control), to a $CO_2$ screw compressor 144, to a chiller 145 (e.g., a heat exchanger), a $CO_2$ storage tank 146, and downstream to the rest of the $CO_2$ compression or use systems. The flowrate at the $CO_2$ screw compressor 144, also generally variable speed, indirectly sets a pressure in the capture vessel TS3 during a desorption process of the regeneration stage.

A desorption flowrate required is much higher than a raw exhaust flowrate on both a mass and volume basis. In addition, given the higher temperature, a pressure drop through the capture vessel would also be higher, up to 10 psi, vs. 1-2 psi for adsorption, resulting in high electrical loads. In the present disclosure, the CO2 gas produced during the desorption process is recirculated to support these higher flowrates, and more importantly, a powering for a recirculation of the $CO_2$ gas is performed by the $CO_2$-turbocharger 138.

Heat used to power the $CO_2$-turbocharger 138, and to heat a capture vessel TS3, TS4, or TS5 during the regeneration stage, comes from the exhaust of the engine 112. After passing through valve T3D and the cooler 140, a portion of the $CO_2$ gas released from the relevant capture vessel TS3, TS4, or TS5 (e.g., capture vessel TS3 in this example,) enters a turbocharger compressor 148 of the $CO_2$-turbocharger 138 via manifold 149, boosted in pressure (e.g., to 15-25 psi), raising the temperature of the $CO_2$ gas to 300° F. or more. In other words, the manifold 149 connects capture vessel TS3, TS4, and TS5 to the turbocharger compressor 148 of the $CO_2$-turbocharger 138 to transport a $CO_2$ stream of $CO_2$ gas generated by a capture vessel set in the regeneration stage to the turbocharger compressor 148.

The heated $CO_2$ gas from the turbocharger compressor 148 then enters the $CO_2$ heat exchanger ($CO_2$ HX) 118, and is heated to near raw exhaust temperature, typically 800-900° F., by a heat exchange process that uses the exhaust from the engine 112 for further heating the heated $CO_2$ gas to produce hot $CO_2$ gas. This hot $CO_2$ gas is then expanded through an expander 150 (e.g., a decompressor) of the $CO_2$-turbocharger 138 (which causes the temperature of the hot $CO_2$ to drop due to less pressure). However, due to the super-heating process performed by the turbocharger compressor 148 and the $CO_2$ heat exchanger ($CO_2$ HX) 118, the $CO_2$ gas exiting the expander 150 still has a temperature equal to or greater than 600° F. that is sufficient for the regeneration process, and still at a pressure high enough to support a flow through the capture vessel TS3, TS4, or TS5 that is performing the regeneration (e.g., capture vessel TS3 in this example). For example, a pressure increase on a compressor side of the $CO_2$-turbocharger 138 significantly exceeds a pressure decrease on an expander side of the $CO_2$-turbocharger 138, such that a pressure of the $CO_2$ gas exiting the expander 150 toward the capture vessel TS3, TS4, or TS5 is high enough to support the flow of the $CO_2$ gas through the capture vessel TS3, TS4, or TS5 that is performing the regeneration. The expander 150 may be respectively coupled to the capture vessels TS3, TS4, TS5 via manifolds 152, 154, and 156 to provide a heated $CO_2$ gas to a capture vessel that is set in the regeneration stage. At an end of the regeneration process, virtually no $CO_2$, and almost no water, remains in the capture vessel TS3, TS4, or TS5 that is performing the regeneration (e.g., the capture vessel TS3).

As a result of the regeneration process, the media (e.g., the mole sieve) of the capture vessel TS3, TS4, or TS5 is hot, typically with an average temperature of about 500° F., and must be cooled to prepare the capture vessel for a next $CO_2$ adsorption cycle. A cooling process for the capture vessel TS3 is accomplished by opening valves T3C and T3X, while closing valves T3In, T3T, T3H, and T3D. In other words, the dry (warm) $N_2$ gas that exits the capture vessel set in the adsorbing stage (e.g., capture vessel TS5 for cooling of capture vessel TS3) is directed into the capture vessel TS3 for cooling the media of the capture vessel TS3.

The cooling process need not return the media temperature fully to ambient temperature. Any temperature under 100° C. (212° F.) will provide some capacity for initial adsorption of $CO_2$, with temperatures near or below 50° C. (122° F.) being preferred. The cooling process may continue in parallel with the adsorption process to some extent since a raw exhaust stream from cooler P2T (e.g., a heat exchanger) is provided at nominally 10° C. (50° F.).

In addition, the carbon capture system 100 may include a coolant tank 158 or another coolant source or circulator that is configured to circulate coolant through a capture vessel (e.g., capture vessels TS3, TS4, or TS5) that is configured in an adsorption stage. The coolant may be circulated through a coil of an inter-exchanger of the capture vessel, as described further in connection with FIG. 5, while the capture vessel is performing $CO_2$ adsorption. In some implementations, the inter-exchanger may be used to circulate the coolant in the capture vessel during the cooling stage.

Figure 2:
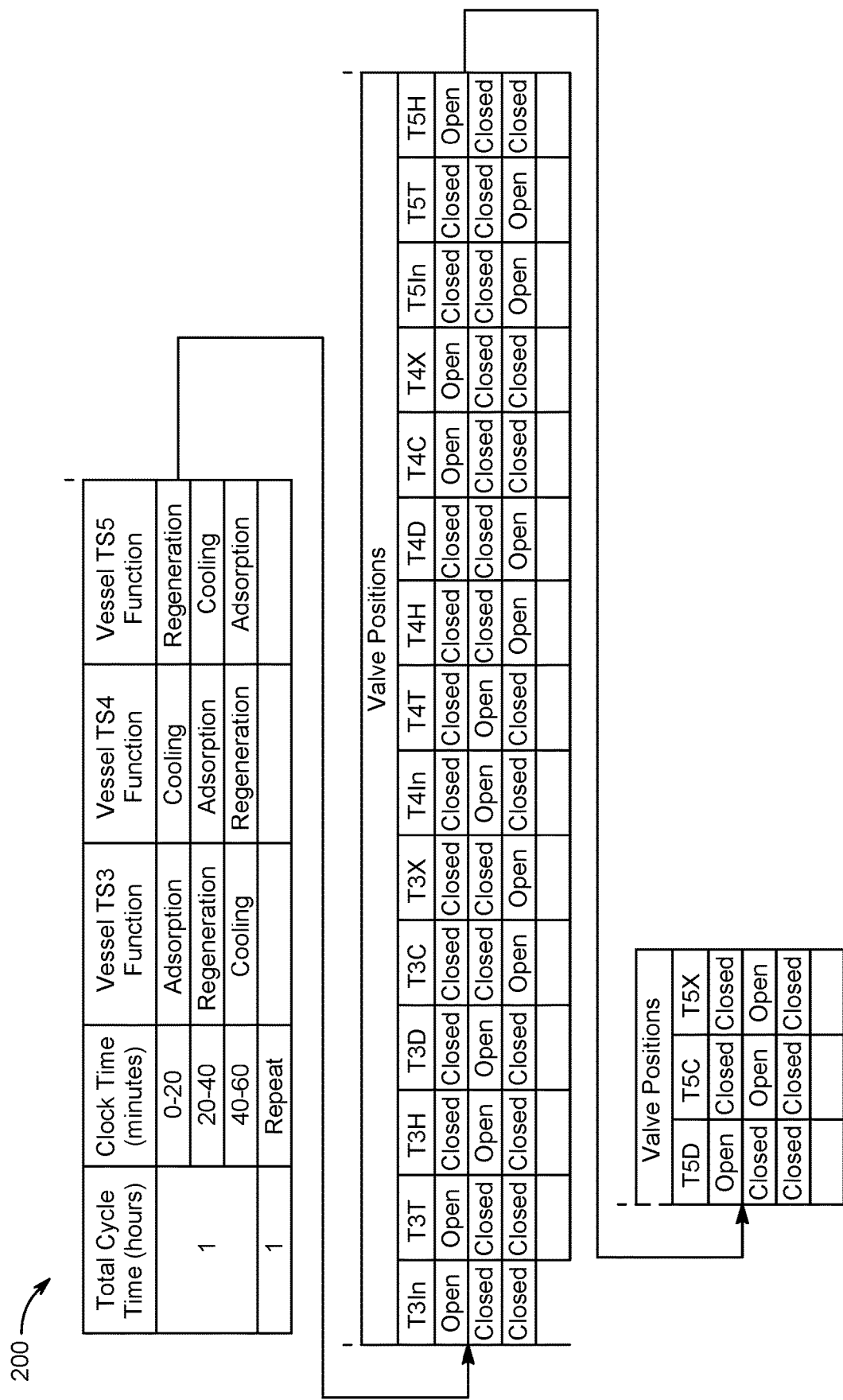
FIG. 2 shows an example cycle timing diagram of a $CO_2$-TSA process using three capture vessels and a plurality of valves for a batch sequence.

FIG. 2 shows an example cycle timing diagram 200 of the $CO_2$-TSA process using capture vessels TS3, TS4, and TS5, including a state of each of the valves during each stage, including the adsorption stage, the cooling stage, and the regeneration stage of the batch sequence.

Figure 3:
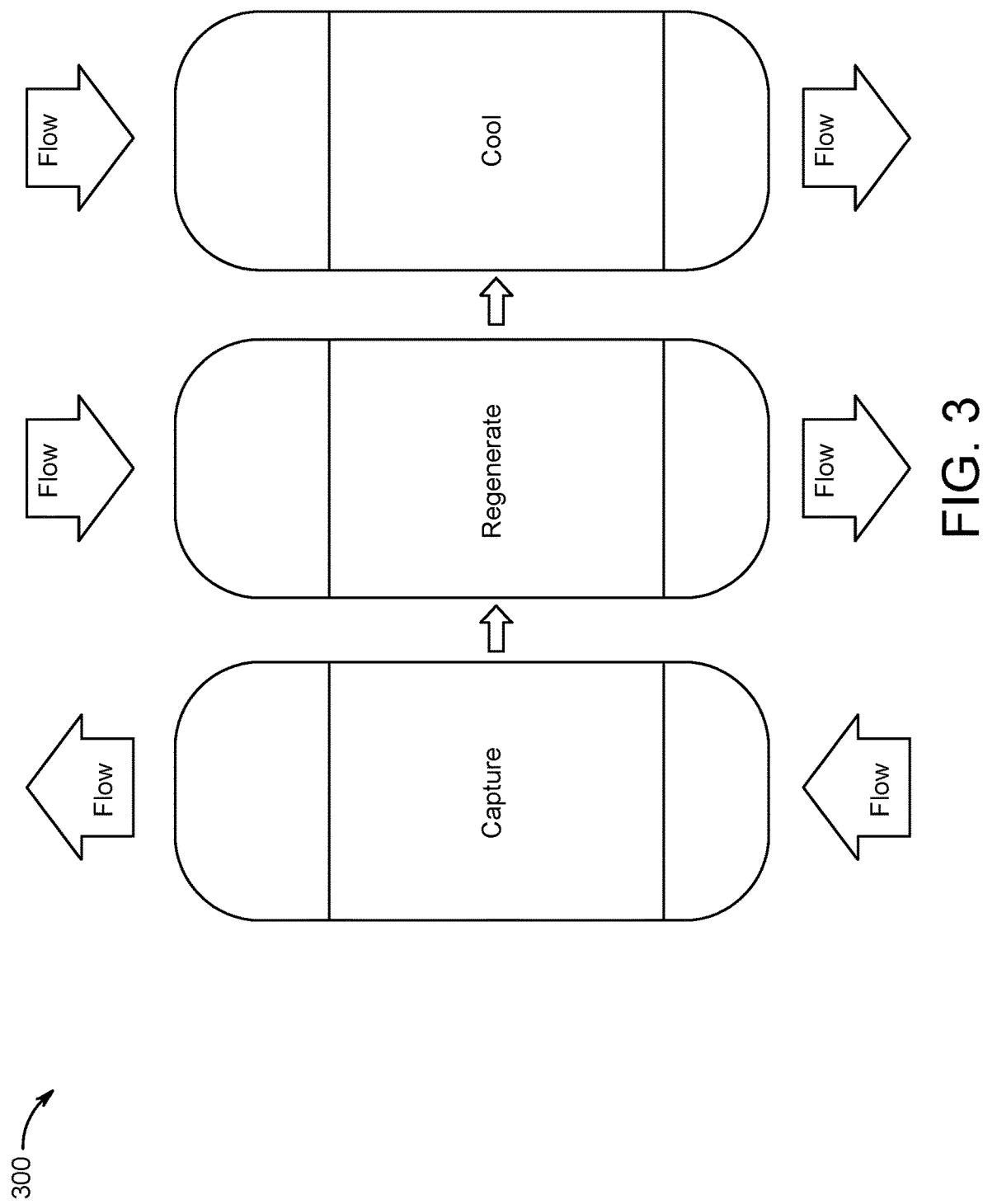
FIG. 3 shows an example diagram showing flow directions of fluid flow and a process sequence in a capture vessel.

FIG. 3 shows an example diagram 300 showing flow directions of fluid flow and a process sequence in a capture vessel (e.g., capture vessel TS3). The directions of fluid flow correspond to directions in FIG. 1, where an upward flow corresponds to a flow from a bottom of the capture vessel to a top of the capture vessel (e.g., away from valves T3X, T4X, and T5X), and downward flow corresponds to a flow from the top of the capture vessel to the bottom of the capture vessel (e.g., toward valves T3X, T4X, and T5X).

Figure 4:
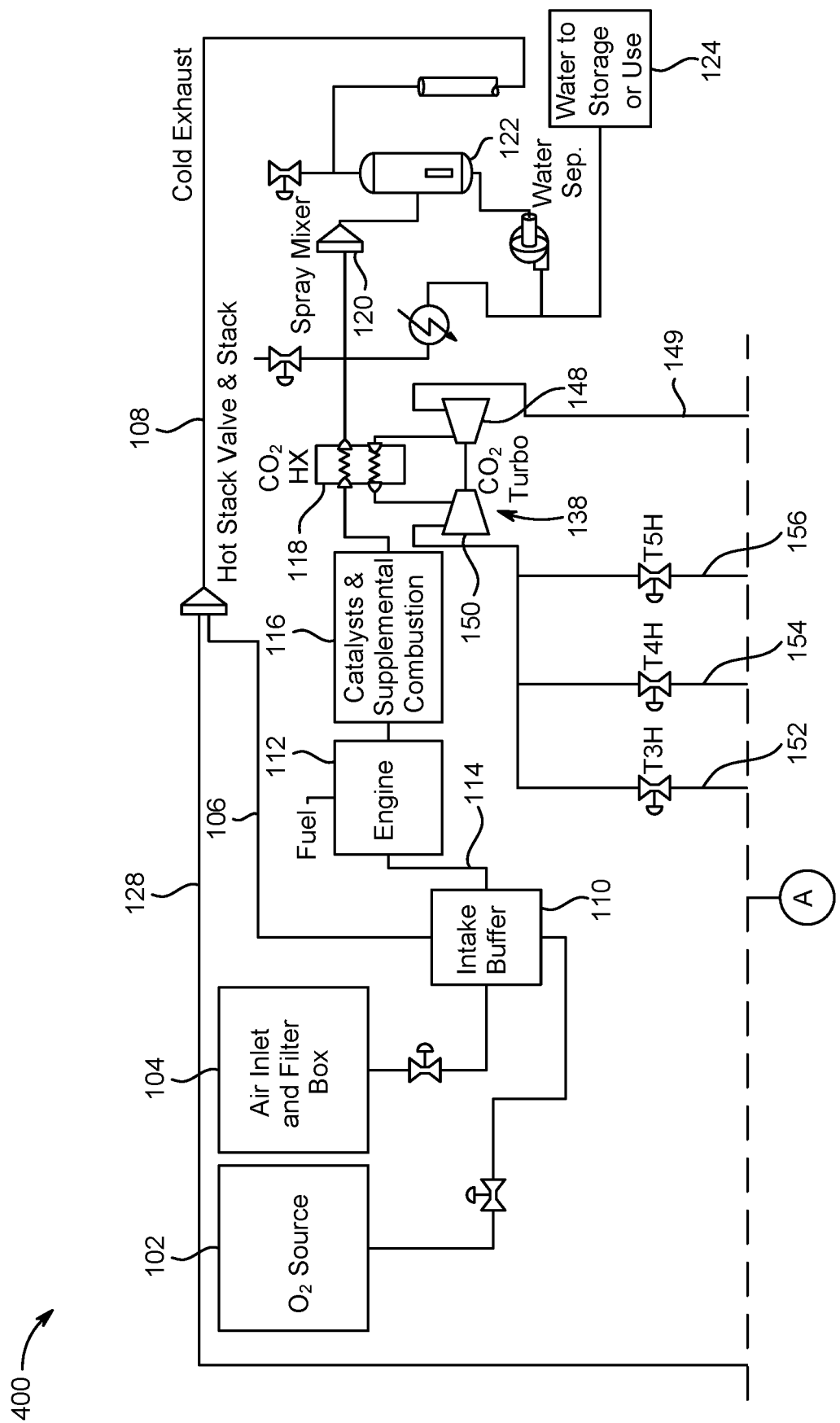
FIG. 4 illustrates a carbon capture system according to one or more implementations.
Figure 4:
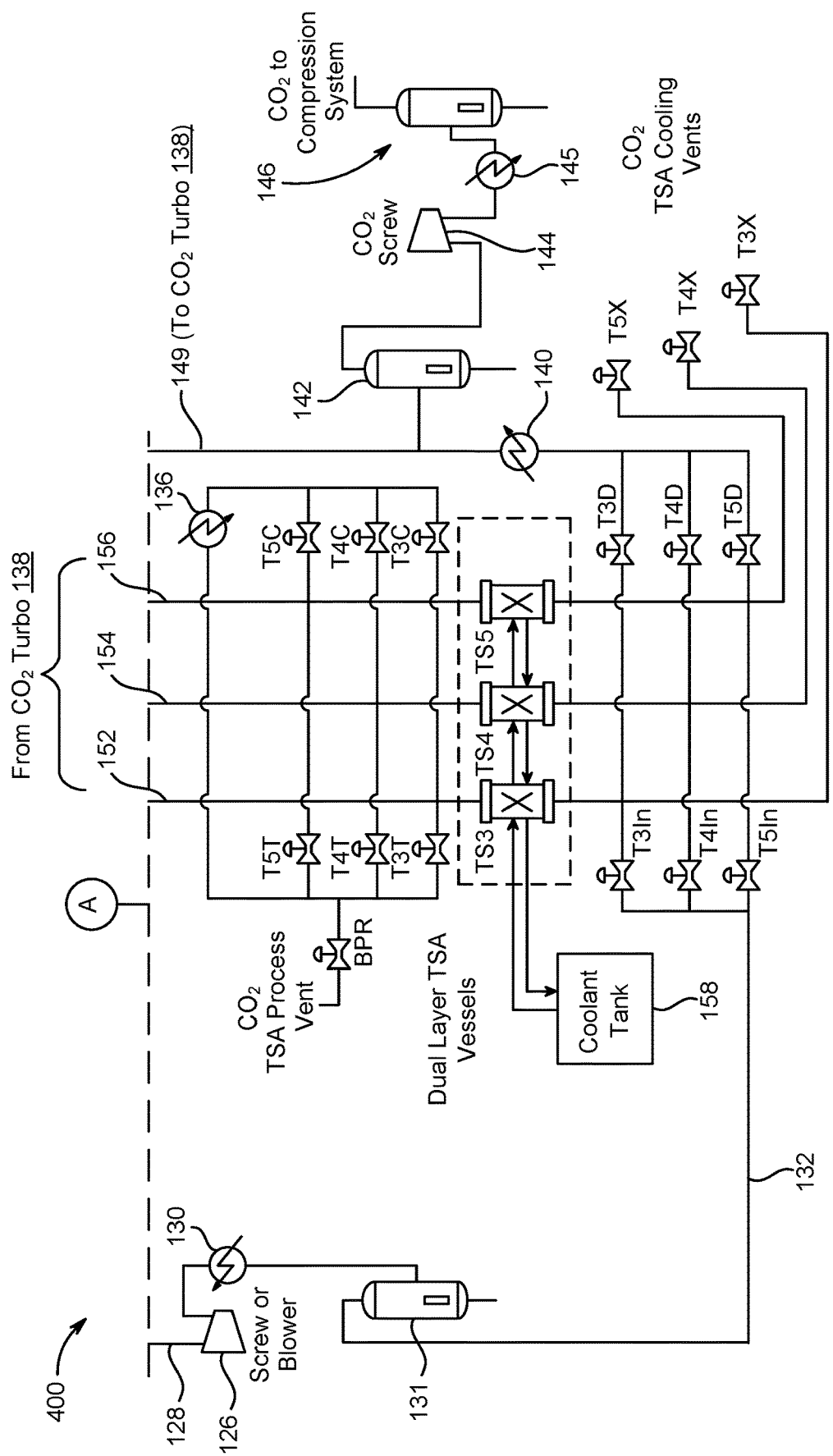

FIG. 4 illustrates a carbon capture system 400 according to one or more implementations. The carbon capture system 400 is similar to the carbon capture system 100 described in connection with FIG. 1, with the exception that the capture vessels TS3, TS4, and TS5 are used for both adsorbing water for dehydration and for adsorbing (capturing) $CO_2$. Thus, the capture vessels TS3, TS4, and TS5 additionally perform the water dehydration process carried out by the adsorbent vessels TSA1 and TSA2 described in connection with FIG. 1.

Figure 5:
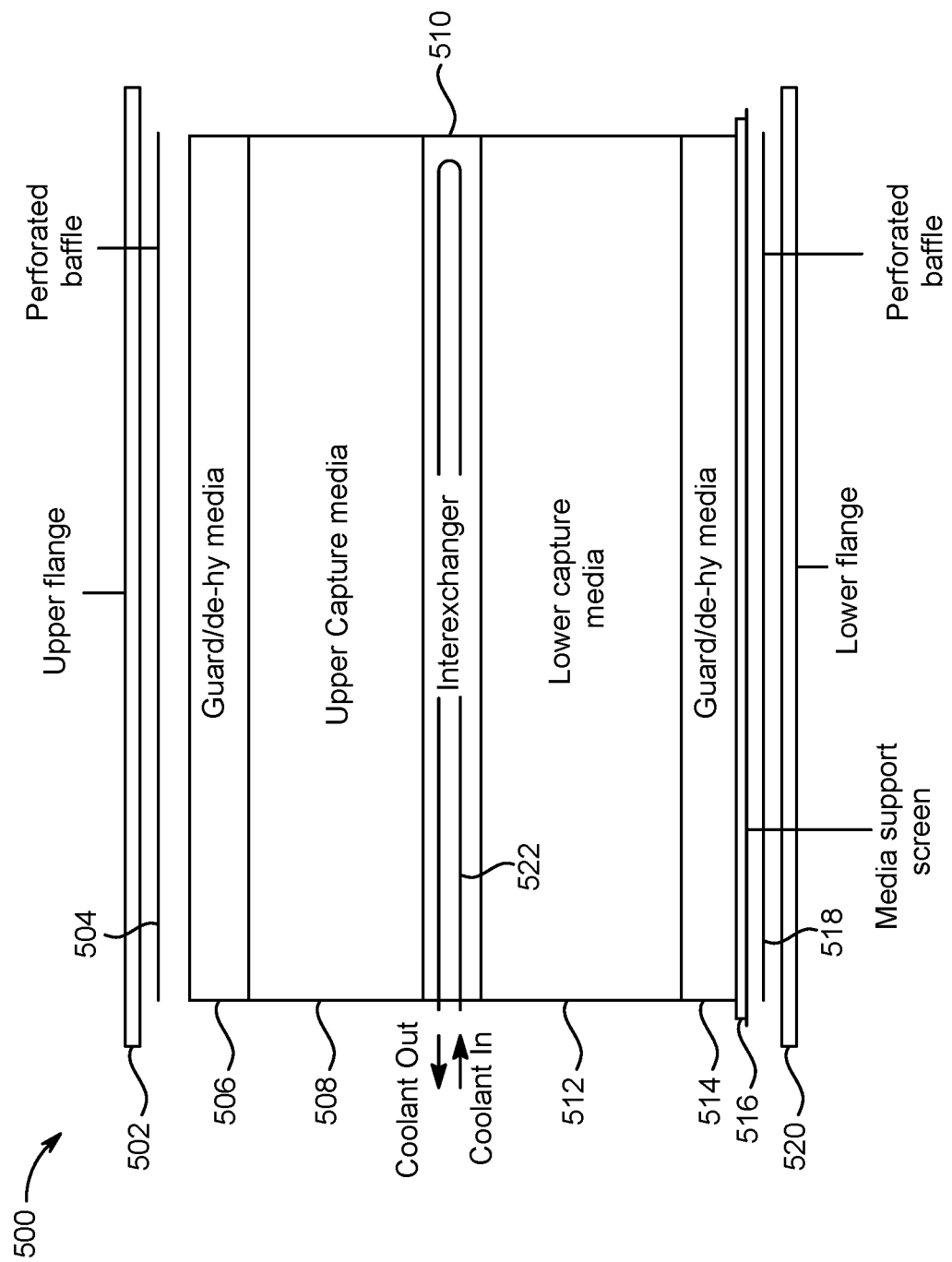
FIG. 5 shows a cross-section of a capture vessel according to one or more embodiments.

FIG. 5 shows a cross-section of a capture vessel 500 according to one or more embodiments. For example, the capture vessel 500 may be used for $CO_2$ adsorption during a $CO_2$-TSA process. In other words, the capture vessel 500 may correspond to any one of the capture vessels TS3, TS4, and TS5 described in connection with FIG. 1.

The top-down, the capture vessel 500 includes an upper flange 502, an upper perforated baffle 504, an upper guard 506 of dehydrating media, an upper capture media 508 (e.g., an upper bed), an inter-exchanger 510, a lower capture media 512 (e.g., a lower bed), a lower guard 514 of dehydrating media, a media support screen 516, a lower perforated baffle 518, and a lower flange 520. Thus, the inter-exchanger 510 is arranged between and in thermal contact with the upper capture media 508 and the lower capture media 512. The inter-exchanger 510 is configured to reduce temperature in the upper capture media 508 and/or the lower capture media 512 during $CO_2$ adsorption and is configured to aid in cooling during $CO_2$ adsorption. In some implementations, the inter-exchanger 510 may be enabled during the cooling stage. For example, the inter-exchanger 510 may be used to circulate the coolant in the capture vessel during the cooling stage to aid in cooling of the media.

For example, the upper guard 506 and the lower guard 514 include dehydrating media that has an affinity for water. The exhaust gas from the adsorption inlet 132 may flow into the capture vessel 500 via the upper flange 502 or via the lower flange 520. The upper guard 506 or the lower guard 514 that initially receives the exhaust gas from the adsorption inlet 132 removes water from the exhaust gas to dehydrate the exhaust gas going to the upper capture media 508 and/or the lower capture media 512. Assuming the lower guard 514 initially receives the exhaust gas from the adsorption inlet 132, the lower capture media 512 will start to capture $CO_2$ before the upper capture media 508 starts to capture $CO_2$. Prior to adsorption the capture vessel 500 is cooled during the cooling stage to increase a capture capacity of the upper capture media 508 and the lower capture media 512. However, adsorption of $CO_2$ causes the capture media 508 and 512 to release heat, causing a temperature of the capture media to rise. Since the lower capture media 512 will start to capture $CO_2$ first and start to release heat, the heat released as a result of the $CO_2$ adsorption at the lower capture media 512 may flow toward the upper capture media 508 and lower the capture capacity of the upper capture media 508 due to an increase in temperature at the upper capture media 508. This thermal wave associated with a heat of $CO_2$ adsorption can decrease a capture efficiency of a $CO_2$ capture system. For example, higher temperatures cause a capture efficiency of a capture media to decrease. High enough temperatures (e.g., temperatures exceeding a temperature threshold) may render a capture media inert for $CO_2$ capture.

The inter-exchanger 510 may include at least one coil 522 or exchanger bundle configured to carry a coolant. For example, the coil 522 may circulate the coolant through the inter-exchanger 510 to absorb or otherwise take away heat generated in the lower capture media 512 and/or the upper capture media 508 during $CO_2$ adsorption. The coolant may be a cool fluid (e.g., a cool gas, liquid, or fluid mixture) that flows from in inlet to an outlet of the inter-exchanger 510 to carry heat out of the capture vessel 500 during the adsorption stage. In other words, the coolant may be injected into the inter-exchanger 510 when it is desired to lower a temperature of the lower capture media 512 and/or the upper capture media 508. The coil 522 is configured to maintain separation of the coolant from the capture media such that the coolant does not physically interact with the capture media or the exhaust gas flowing through the capture vessel 500. In some implementations, the coil 522 is embedded in the capture media such that the lower capture media 512 and the upper capture media 508 are not physically separated from each other. Instead, the capture media may be filled around the coil 522.

The inter-exchanger 510 may be arranged to provide contact between individual bed media pellets and a heat transfer surface of the coil 522. The coil 522 of the inter-exchanger 510 may be made of stainless steel or another lightweight alloy construction, consistent with temperature excursions of the regeneration process. The inter-exchanger 510 may maintain temperatures in the lower capture media 512 and/or the upper capture media 508 below 150° F., which may be a temperature at which the capture capacity of the capture media is significantly reduced, made substantially inefficient, and/or made inert or substantially inert.

Even a small reduction in the temperature of the lower capture media 512 and/or the upper capture media 508, which is achievable by cooling the exhaust gas flowing through the capture vessel 500 via the inter-exchanger, may significantly increase the capture capacity of the capture vessel 500. Thus, the inter-exchanger 510, distributed internally within the capture vessel 500, is configured to manage the thermal wave associated with the heat of adsorption by lowering the temperature of the lower capture media 512 and/or the upper capture media 508 to increase the capture capacity of the capture vessel 500 during the adsorption stage.

The inter-exchanger 510 may assist in significantly reducing a carbon footprint of a gas turbine engine or a piston engine as a result of achieving a high $CO_2$ capture percentage, generally greater than 95%. Greenhouse gases include $CO_2$, $NO_x$, and $SO_x$ that make part of acid rain and/or attack the ozone layer, as well as unburnt hydrocarbon HC (e.g., methane and non-methane), and any partial products of combustion, like aldehydes. Carbon monoxide, while not commonly considered a greenhouse gas, is a regulated pollutant that converts in the atmosphere quickly to form $CO_2$.

Other capture techniques, like conventional amine, do not address most of these gases. Other mole sieve capture techniques could address these gases, but gases like NOx will go into a capture vessel, but will not come out (in a pressure swing adsorption (PSA) process or a vacuum pressure swing adsorption (VPSA) process) resulting in reduced capture vessel (bed) performance over time. The $CO_2$-TSA described herein has a capability to also capture CO, HC, NOx with proper media choice, but, if those gases are captured, they must be tolerable as contaminants in the $CO_2$. CO and HC are allowed, but frequently $NO_x$ and $SO_x$ are not allowed at high concentration, since they could combine with other gases and create a corrosive mixture.

Figure 6A:
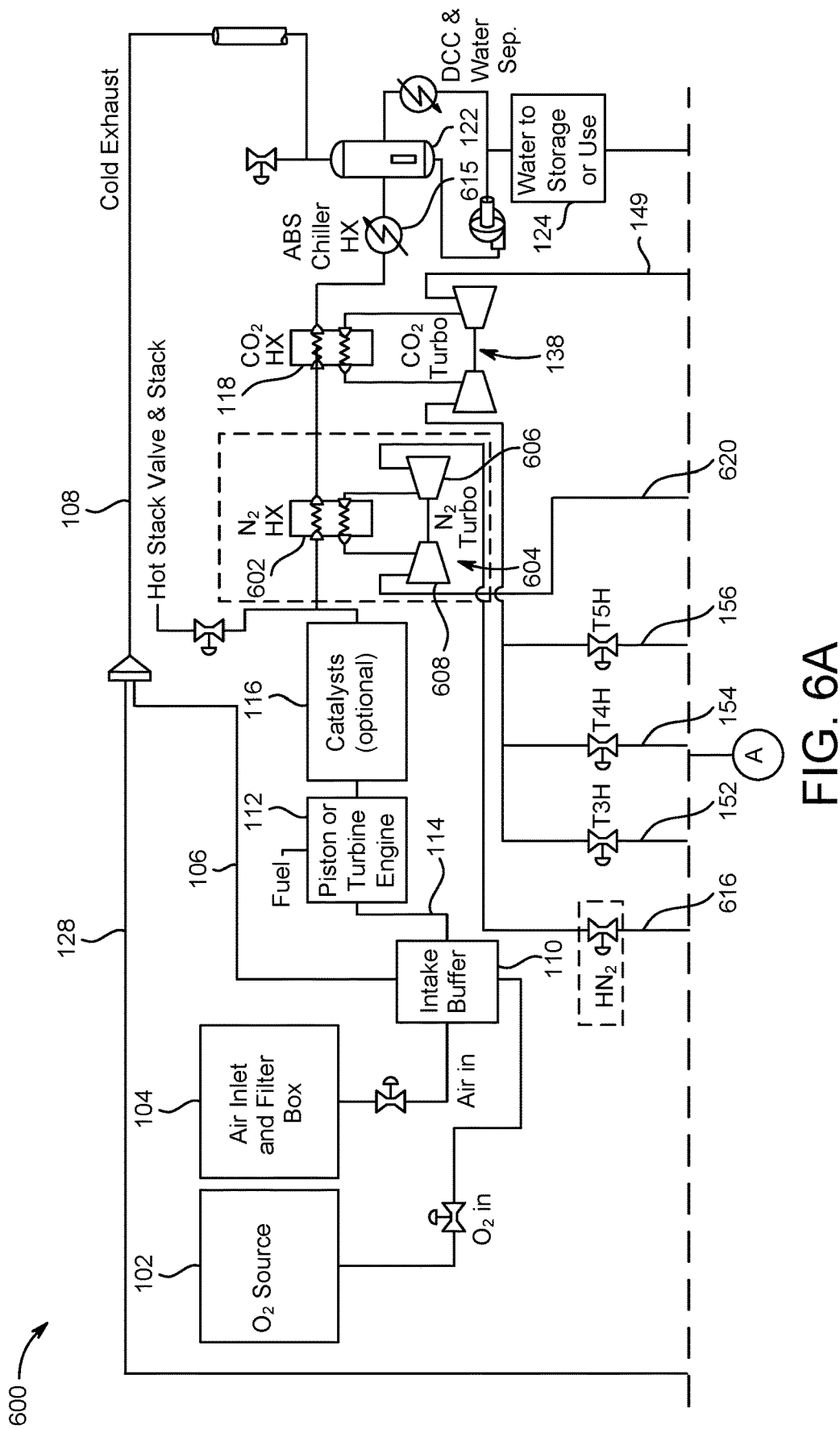
FIGS. 6A-6E illustrates a carbon capture system according to one or more implementations.
Figure 6A:
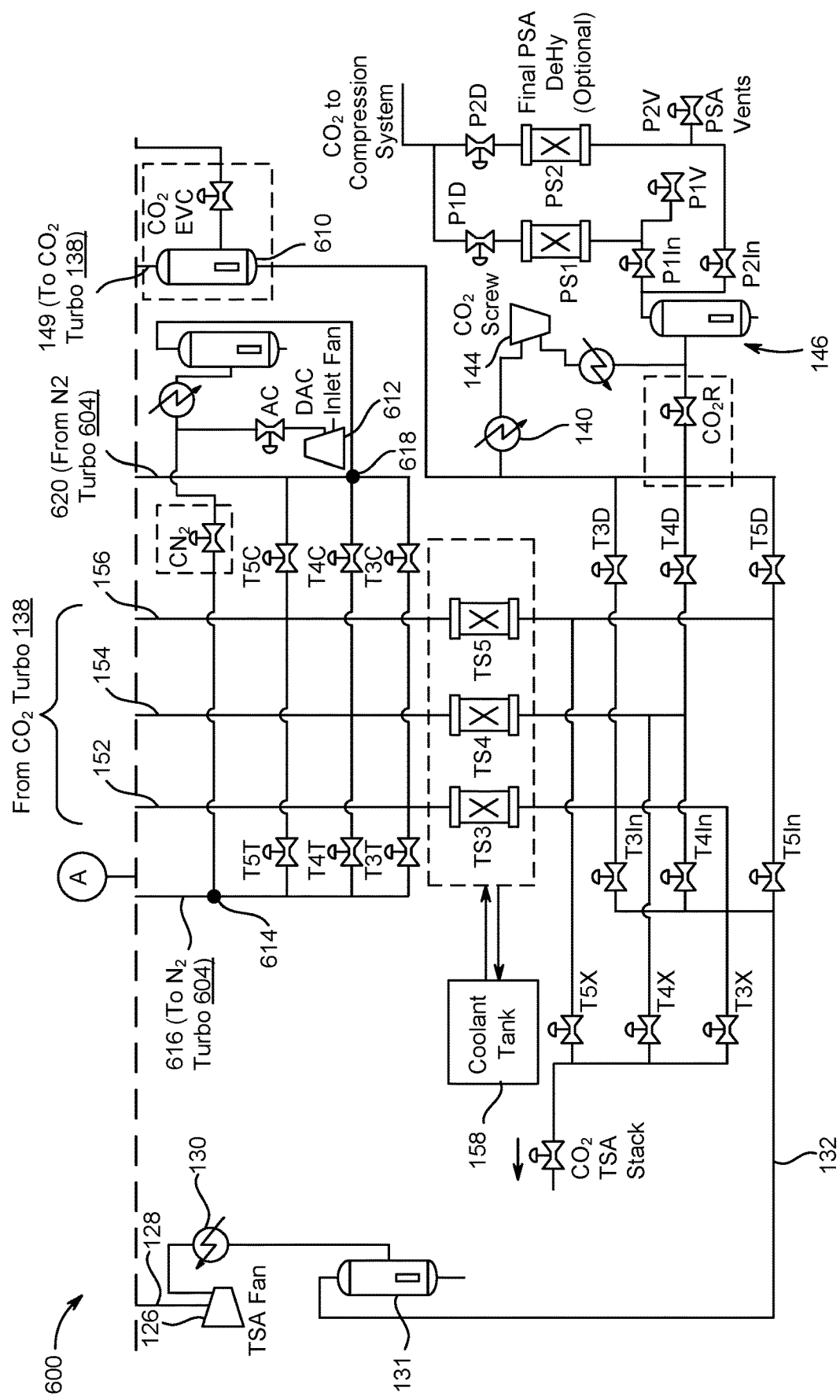
Figure 6B:
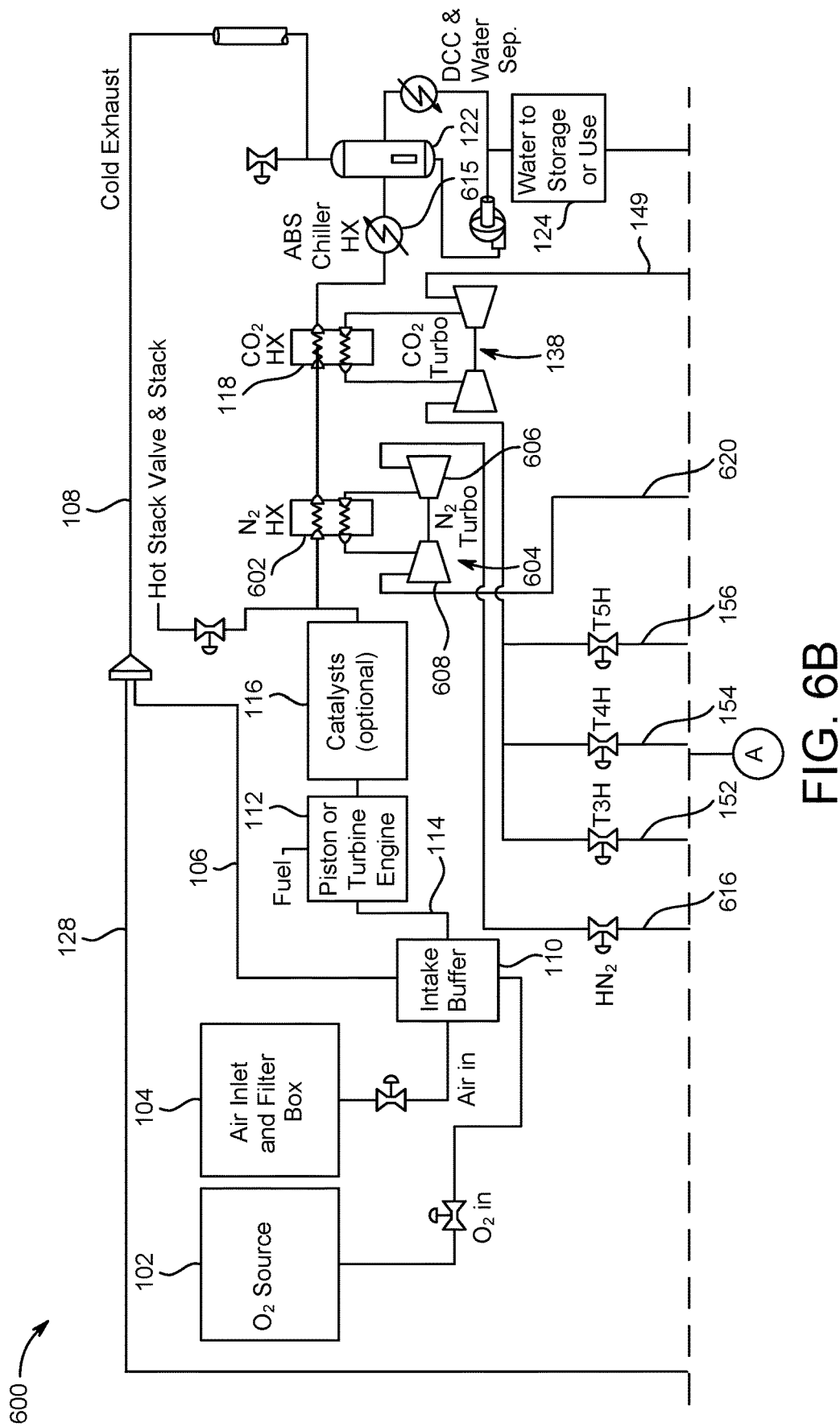
Figure 6B:
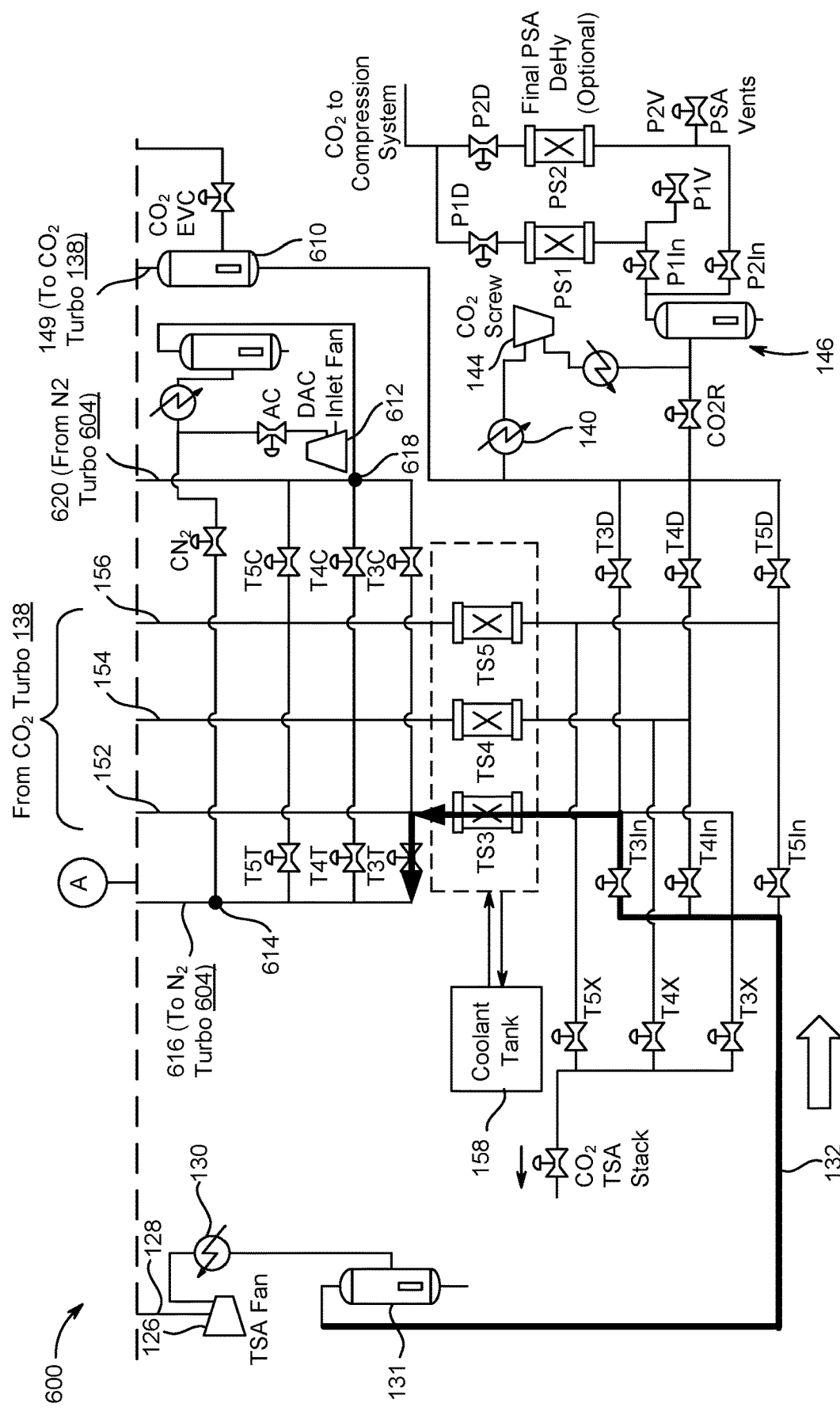
Figure 6C:
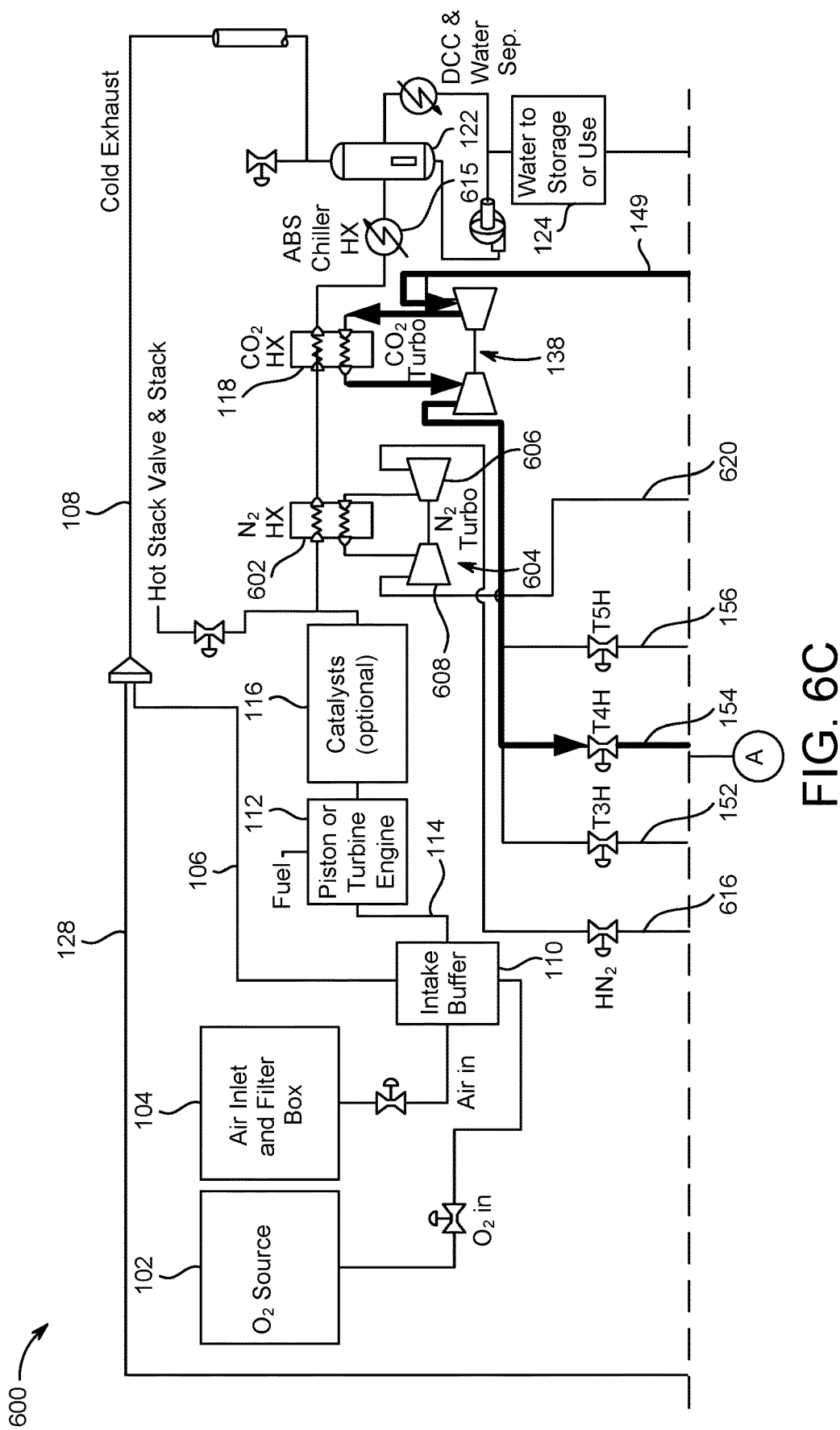
Figure 6C:
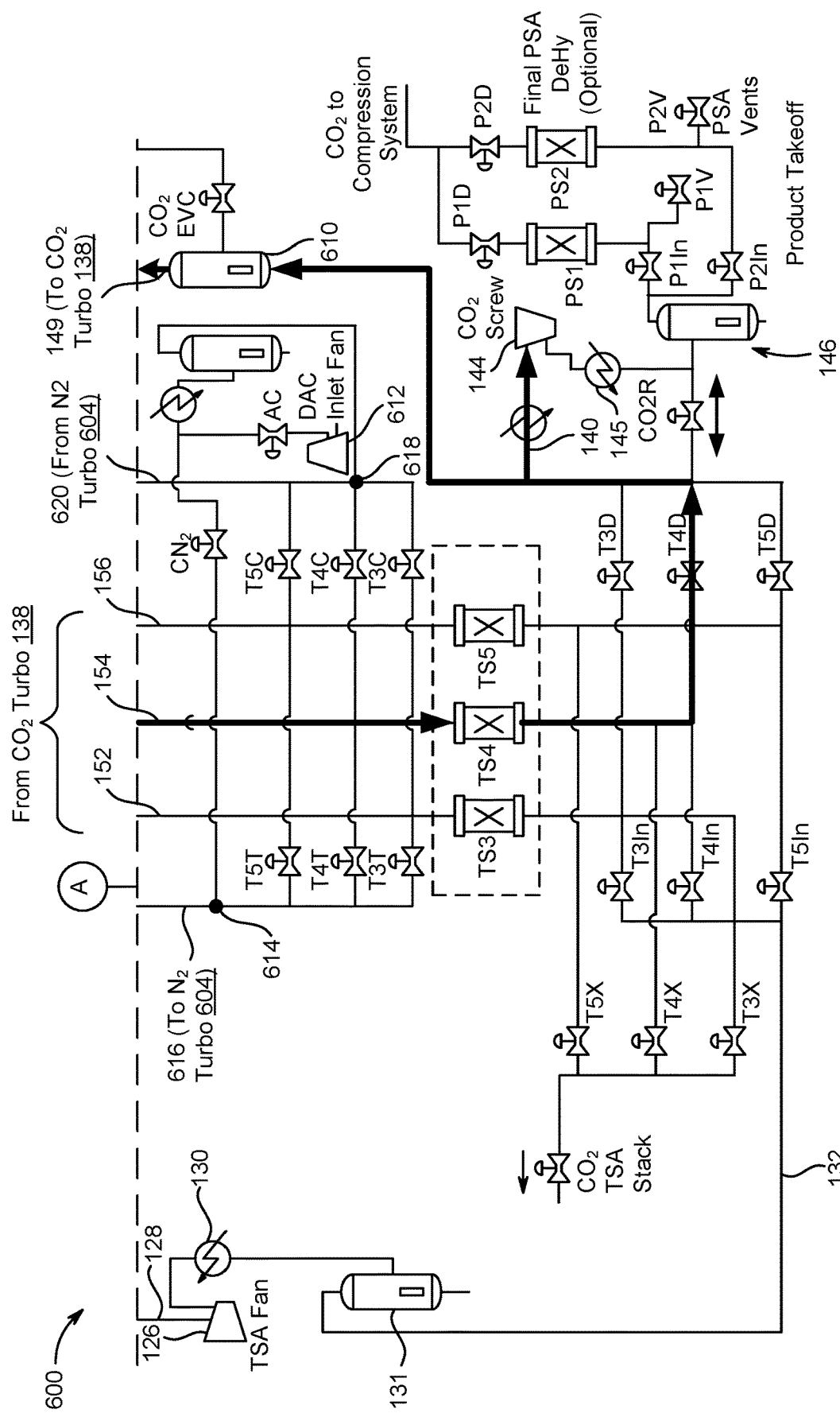
Figure 6D:
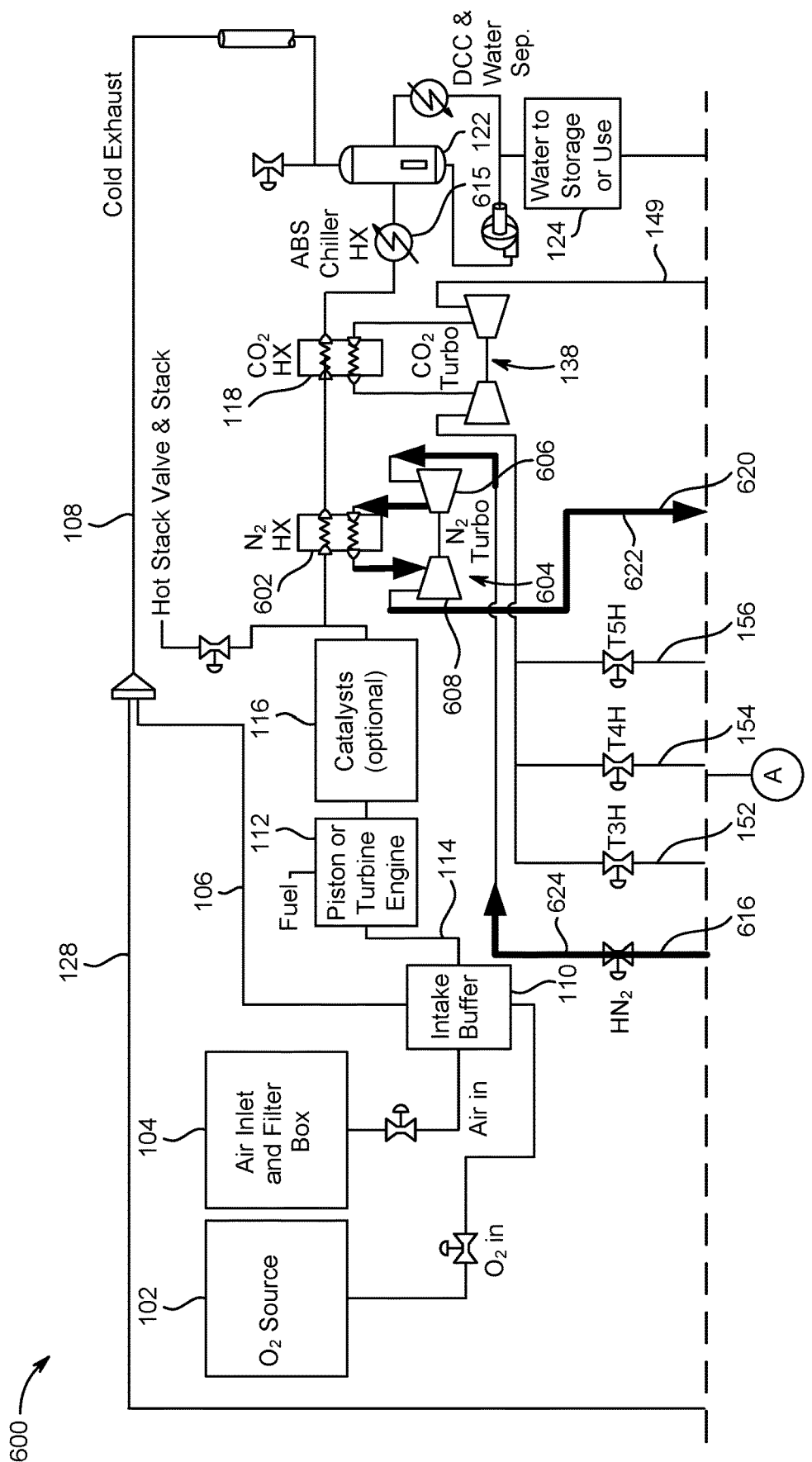
Figure 6D:
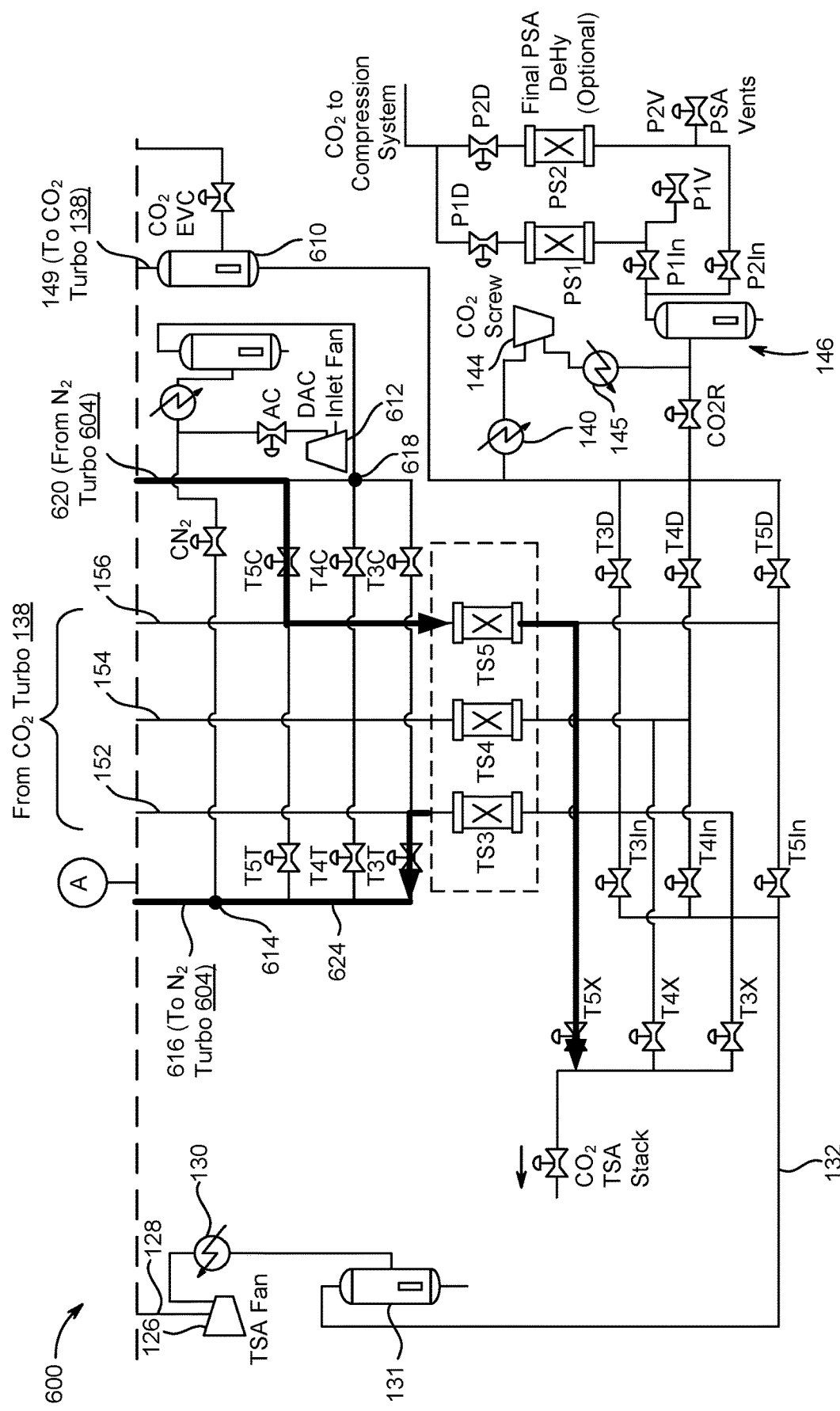
Figure 6E:
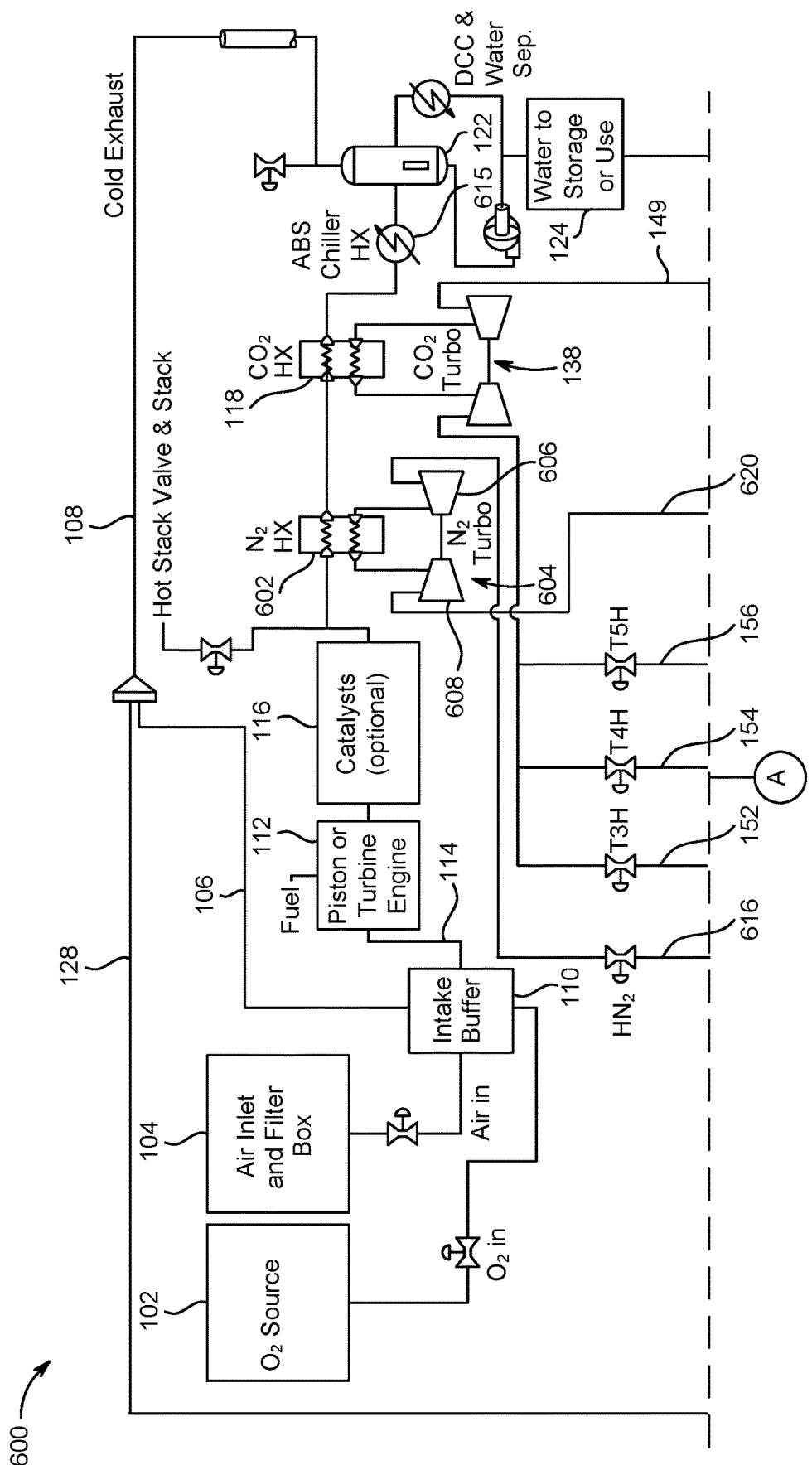
Figure 6E:
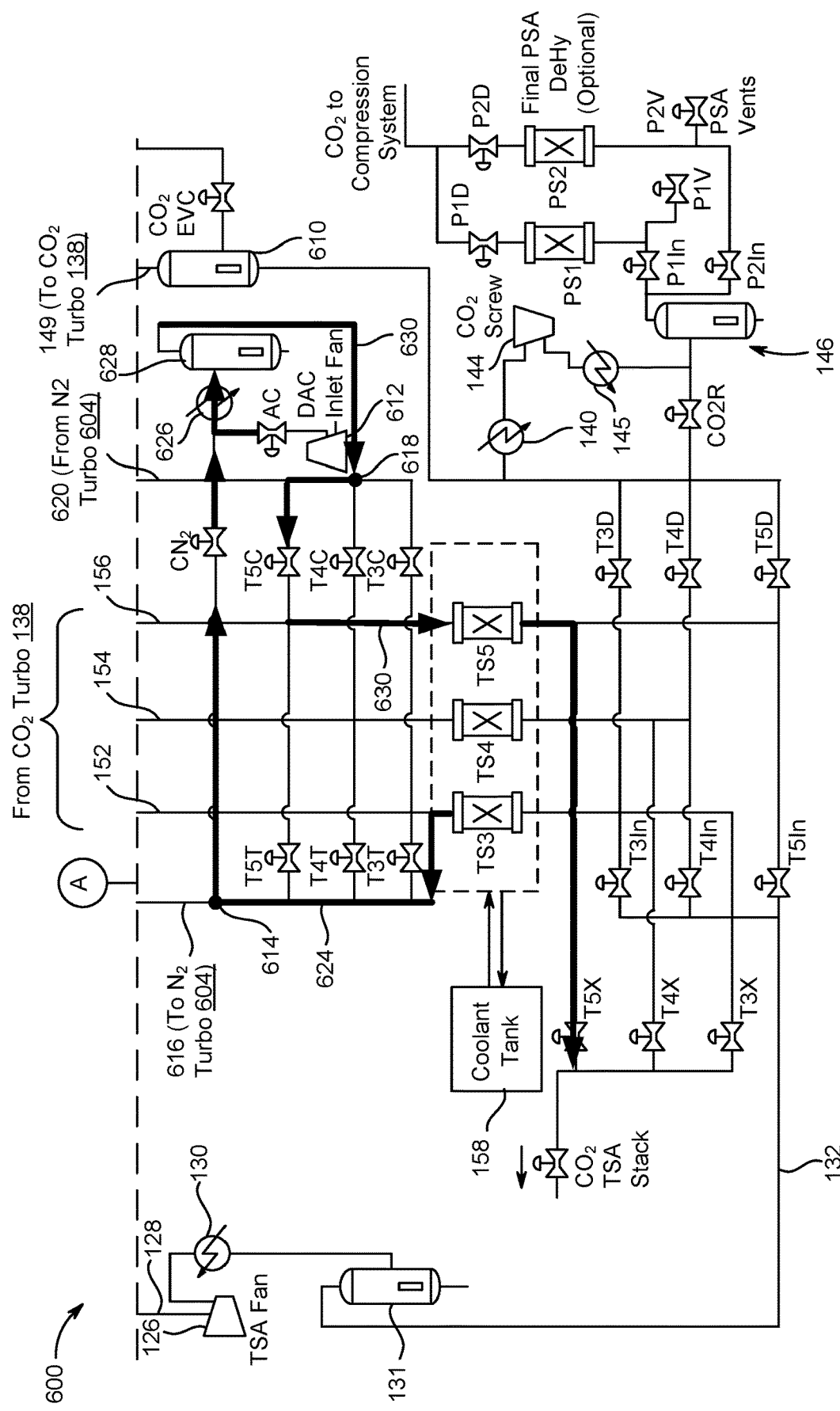

FIG. 6A illustrates a carbon capture system 600 according to one or more implementations. FIG. 6B illustrates a fluid flow path used during a $CO_2$ adsorption stage of a $CO_2$-TSA process in the carbon capture system 600 and is similar to the $CO_2$ adsorption stage described in connection with FIG. 1. FIG. 6C illustrates a fluid flow path used during a regeneration stage of the $CO_2$-TSA process in the carbon capture system 600. FIG. 6D illustrates a fluid flow path used during a drying stage of the $CO_2$-TSA process in the carbon capture system 600. FIG. 6E illustrates a fluid flow path used during a cooling stage of the $CO_2$-TSA process in the carbon capture system 600.

The carbon capture system 600 adds additional components and manifolds to the carbon capture system 400 described in connection with FIG. 4. For example, the carbon capture system 600 includes an $N_2$ heat exchanger ($N_2$ HX) 602, an $N_2$-turbocharger 604 that includes a compressor 606 and an expander 608, a valve HN2, a valve CN2, a valve CO2R, and a $CO_2$ evaporative cooler ($CO_2$ EVC) 610, a direct air capture (DAC) inlet fan 612, and a valve AC. These components may improve the performance of the carbon capture system 600 in terms of total $CO_2$ percentage captured, system stability (e.g., both in terms of production rate and component duty), and system powering. The compressor 606 may be arranged at an inlet of the $N_2$-turbocharger 604 and is coupled to adsorption outlet 614 of the capture vessels TS3, TS4, and TS5 via manifold 616. The expander 608 may be arranged at an output of the $N_2$-turbocharger 604 and is coupled to an inlet 618 of the capture vessels TS3, TS4, and TS5 via manifold 620.

In addition, an ABS chiller heat exchanger (HX) 615 is provided to chill the exhaust exiting the $CO_2$ heat exchanger ($CO_2$ HX) 118. The $CO_2$ evaporative cooler ($CO_2$ EVC) 610 is arranged between valves T3D, T4D, and T5D and the CO2-turbocharger 138. In addition, optional valves P1in, P2in, P1V, P2V, P1D, P2D are added, as well as optional PSA vessels PS1 and PS2.

In the carbon capture system 600, a drying cycle (e.g., a hot drying cycle) is added after the regeneration stage and before the cooling stage of the batch sequence of the $CO_2$-TSA process described in connection with FIG. 1. Thus, once a capture vessel (e.g., TS3, TS4, or TS5) undergoes a regeneration process, the capture vessel undergoes a drying cycle before the capture vessel undergoes a cooling process. In addition, water may be used during the regeneration stage (e.g., a wet regeneration). In addition, a change in a regeneration flow direction may be reversed, as compared to the flow direction for regeneration shown in FIG. 3. For example, in FIG. 3, the flow direction for regeneration may be a flow from the top to the bottom of the capture vessel. In FIG. 6A, the flow direction for wet regeneration may be a flow from the bottom to the top of the capture vessel. This may be accomplished by reconfiguring a piping manifold and/or changing a state of one or more valves to achieve a desired flow direction through the capture vessel.

During operation of the carbon capture system 100 shown in FIG. 1, a temperature at a bed exit (e.g., valves T3D, T4D, or T5D), without temperature mitigation in a $CO_2$ recirculation loop, may vary at an inlet of the $CO_2$-turbocharger 138 from about 100° F. to greater than 500° F. during the regeneration process. A rate of $CO_2$ production may also change from a negative rate (e.g., capture vessel adsorbing $CO_2$ early in the regeneration process) to a very high rate, over 1.5 times an average rate, through much of the regeneration process. In addition, about 10% of the captured $CO_2$ may remain in the capture vessel TS3, TS4, or TS5, even after regeneration performed at greater than 600° F.

Referring to FIGS. 6A-6E, the $CO_2$-TSA process is a batch process. Whether using a three-stage adsorption, regeneration, and cooling process or a four-stage adsorption, regeneration, drying, and cooling process, the production of $CO_2$ will not be constant, but will occur only during the regeneration process, and generally only later in the regeneration process, after the relevant capture vessel TS3, TS4, or TS5 has warmed up. However, a constant flowrate of $CO_2$ is preferred over an uneven flowrate of $CO_2$. Accordingly, valve $CO_2R$ may be provided to allow for recycling $CO_2$ during regeneration. The valve $CO_2R$ may function as a pressure regulator, opening to prevent the capture vessel TS3, TS4, and TS5 from going into a high vacuum condition during an instant when a capture value switches from adsorption to regeneration, and partial pressure of $CO_2$ in the capture value increases dramatically.

While FIG. 6A shows a final dehydration via PSA after the capture process, it is also possible to replace the $CO_2$ evaporative cooler ($CO_2$ EVC) 610 with vessels PS1 and PS2, loaded with a ceramic like alumina, that will serve to both regulate the temperature at the inlet of the $CO_2$ turbo and to dehydrate the product $CO_2$ before returning to the $CO_2$ heat exchanger ($CO_2$ HX) 118 and the capture vessels TS3, TS4, and TS5.

$CO_2$ Recycling During Regeneration

During an initial start of the regeneration stage, $CO_2$ is lacking in a main regeneration loop (e.g., the $CO_2$ recirculation loop) shown in FIG. 6C and it would take some time for enough $CO_2$ to be present for the $CO_2$-turbocharger 138 in the main regeneration loop to become effective. The $CO_2$ storage tank 146 may be used in a secondary regeneration loop to provide additional $CO_2$ (e.g., auxiliary $CO_2$) to the $CO_2$-turbocharger 138 during the initial start of the regeneration stage. For example, valve $CO_2R$ may be opened to allow $CO_2$ stored in the $CO_2$ storage tank 146 to be injected into a main regeneration loop. After a predetermined duration, valve $CO_2R$ may be closed. At this time, more than a sufficient amount of $CO_2$ is present in the main regeneration loop and a small percentage can be siphoned off from the main regeneration loop by the secondary regeneration loop at the cooler 140, and provided through the $CO_2$ screw compressor 144, to a chiller 145, and ultimately to the $CO_2$ storage tank 146 to replenish the $CO_2$ supply in the $CO_2$ storage tank 146. The replenished $CO_2$ supply may be used for the initial start of a next regeneration stage (e.g., regeneration of the next capture vessel) by opening the $CO_2R$ valve.

Thus, the secondary regeneration loop includes a $CO_2$ source (e.g., the $CO_2$ storage tank 146) that may be configured to inject the auxiliary $CO_2$ into the $CO_2$ stream of the main regeneration loop during an initial time interval of the regeneration stage. Additionally, the $CO_2$ source may be configured to siphon off a portion of the $CO_2$ stream from the main regeneration loop during a remaining time interval of the regeneration stage to replenish the $CO_2$ supply that may be used for the initial start of a next regeneration stage (e.g., for a next capture vessel that enters into the regeneration stage).

Accordingly, valve $CO_2R$ and the $CO_2$ storage tank 146 may be used to increase an amount of $CO_2$ in the main regeneration loop that flows into the $CO_2$ evaporative cooler ($CO_2$ EVC) 610 in order to decrease an amount of time until the $CO_2$-turbocharger 138 becomes effective for regeneration of a capture vessel.

$CO_2$ Evaporative Cooler ($CO_2$ EVC) for Wet Regeneration

The $CO_2$ evaporative cooler ($CO_2$ EVC) 610 may be used during the regeneration stage to provide wet regeneration of a respective capture vessel TS3, TS4, or TS5. The $CO_2$ evaporative cooler ($CO_2$ EVC) 610 may introduce water vapor into a $CO_2$ stream in order to improve a $CO_2$ release at the respective capture vessel by displacing adsorbed $CO_2$ with adsorbed water vapor. Heat is created during the adsorption of the water vapor, which raises the bed temperature, and which further accelerates $CO_2$ release from the respective capture vessel.

In addition, the $CO_2$ evaporative cooler ($CO_2$ EVC) 610 regulates a temperature of the $CO_2$ flowing into the turbocharger compressor 148 by cooling the $CO_2$. By cooling $CO_2$ flowing into the inlet of the $CO_2$-turbocharger 138 (e.g., into the turbocharger compressor 148), a temperature variation at the inlet of the $CO_2$-turbocharger 138 is reduced. Furthermore, temperatures exceeding 400° at the inlet of the $CO_2$-turbocharger 138 may not be acceptable and may cause failure. Thus, by cooling $CO_2$ flowing into the inlet of the $CO_2$-turbocharger 138, a maximum temperature of the $CO_2$ flowing into the inlet of the $CO_2$-turbocharger 138 may be reduced to be closer to 100° (e.g., to be less than 300° F.). Thus, the $CO_2$ evaporative cooler ($CO_2$ EVC) 610 provides temperature control for the inlet of the $CO_2$-turbocharger 138.

The $CO_2$ evaporative cooler ($CO_2$ EVC) 610 may be a DCC. As shown in FIG. 6C, a portion of the warm $CO_2$ that exits a capture vessel (e.g., the capture vessel TS3) during regeneration is provided to the $CO_2$ evaporative cooler ($CO_2$ EVC) 610 as an inlet $CO_2$ gas. A saturated gas mixture of $CO_2$ and water vapor exits the $CO_2$ evaporative cooler ($CO_2$ EVC) 610 to the $CO_2$-turbocharger 138 for wet regeneration. The saturated gas mixture of $CO_2$ and water vapor has a reduced temperature relative to the warm $CO_2$ that exits the capture vessel.

A source of water for the $CO_2$ evaporative cooler ($CO_2$ EVC) 610, in cases where water is used for regeneration, can be condensed water from the engine exhaust stored in the water storage tank 124. When the $CO_2$ evaporative cooler ($CO_2$ EVC) 610 is operated with the water from the water storage tank 124 shut off, a temperature coming out of a capture vessel (e.g., the capture vessel TS3) may vary from 100-500° F. and is moderated based on a thermal capacity of a ceramic of the capture vessel. For a large ceramic load, approaching 50% of a mole sieve load per capture vessel, a peak temperature can be mitigated so that, even without water spray, an inlet temperature (e.g., less than 300° F.) of the $CO_2$-turbocharger 138 (e.g., an inlet temperature of the turbocharger compressor 148) is acceptable.

When the water from the water storage tank 124 is on continuously, the $CO_2$ evaporative cooler ($CO_2$ EVC) 610 acts as a very effective counter flow heat exchanger. Given a low temperature out of the $CO_2$ evaporative cooler ($CO_2$ EVC) 610, a percentage of water vapor in the saturated gas mixture of $CO_2$ and water vapor will be low. For example, at 100° F., a water vapor percentage may be under 7% by volume and under 3% by weight. Nevertheless, the water vapor is present as the saturated gas mixture of $CO_2$ and water vapor exits the expander 150 of the $CO_2$-turbocharger 138 and is provided to the capture vessel that is performing the regeneration (e.g., the wet regeneration). The $CO_2$-turbocharger 138 is configured to receive the saturated gas mixture of $CO_2$ and water vapor from the evaporative cooler ($CO_2$ EVC) 610, and heat the saturated gas mixture of $CO_2$ and water vapor using the $CO_2$ heat exchanger ($CO_2$ HX) 118 in order to provide a hot mixed stream of $CO_2$ and water vapor to the capture vessel that is configured in regeneration (e.g., a same capture vessel that produces the $CO_2$ stream that is mixed with the water vapor by the evaporative cooler ($CO_2$ EVC) 610).

The $CO_2$ evaporative cooler ($CO_2$ EVC) 610 can also be operated with water on only a percentage of a regeneration cycle. If the water is turned on late during regeneration, when a ceramic mass transfer media of the $CO_2$ evaporative cooler ($CO_2$ EVC) 610 is already hot, a large percentage of water vapor can be created, since a partial pressure of water vapor is 14.7 pounds per square inch absolute (PSIA) at 212° F. This water vapor and variable ability to create water vapor allows the regeneration process to be improved in two ways. First, water is adsorbed preferentially to $CO_2$ in the media of the capture vessel (e.g., capture vessel TS3, TS4, or TS5) performing the regeneration. As a result, water is adsorbed by the media of the capture vessel, and a higher amount of $CO_2$ is released (which is the objective during regeneration). Thus, the water vapor acts like a purge gas (e.g., a water vapor purge gas), but without reducing a dry purity of the $CO_2$ gas that exits the capture vessel. Second, during a process of water vapor adsorption by the media of the capture vessel, heat is created, at nominally 1800 BTU/lb of water vapor. This heat increases the temperature of the capture vessel, which further aids in driving out $CO_2$ from the capture vessel during regeneration. Thus, the water vapor purge derived from an output of the $CO_2$ evaporative cooler ($CO_2$ EVC) 610 is configured to increase a temperature associated with the wet regeneration stage. The net result is that the percentage of carbon captured during adsorption vs. released/produced during regeneration can be increased from nominally 90% (without the $CO_2$ evaporative cooler ($CO_2$ EVC) 610) to greater than 95% (with the $CO_2$ evaporative cooler ($CO_2$ EVC) 610).

Hot Drying Using $N_2$-Turbocharger

As shown in FIG. 6D, the $N_2$ heat exchanger ($N_2$ HX) 602 and the $N_2$-turbocharger 604 are provided for the drying stage (e.g., hot drying) of the $CO_2$-TSA process. The $N_2$-turbocharger 604 is associated with the $N_2$ heat exchanger ($N_2$ HX) 602 and is configured to reduce a power duty. During the drying stage, shown in FIG. 6D, a hot dry gas 622 is created from a gas 624 (e.g., the dry $N_2$ gas) provided after $CO_2$ adsorption, which exits the capture vessel TS3, TS4, or TS5 at valve T3T, T4T, or T5T, respectively. The dry $N_2$ gas 624 is provided to the compressor 606 of the $N_2$-turbocharger 604 by opening valve HN2 and closing valve CN2. In other words, the compressor 606 is connected to the adsorption outlet 614 of the capture vessels TS3, TS4, and TS5 and is configured to receive the dry $N_2$ gas 624 from the capture vessel set in the $CO_2$ adsorption stage via manifold 616.

The dry $N_2$ gas 624 enters the $N_2$-turbocharger 604, where the compressor 606 compresses the dry $N_2$ gas 624 to produce compressed $N_2$ gas. The $N_2$ heat exchanger ($N_2$ HX) 602 uses the hot exhaust from the engine 112 to heat the compressed $N_2$ gas to produce heated (compressed) $N_2$ gas. The expander 608 of the $N_2$-turbocharger 604 then expands the heated $N_2$ gas, which results in a drop in temperature of the heated $N_2$ gas, but the heated $N_2$ gas remains sufficiently high with sufficient pressure to be used for hot drying of a respective capture vessel. The expander 608 is configured to output the hot dry gas 622 that is provided to the capture vessel that is set in the drying stage (e.g., capture vessel TS5). The hot dry gas 622 may be delivered from the expander 608 to the inlet 618 of the capture vessels TS3, TS4, and TS5 via manifold 620. The hot dry gas 622 is delivered to the capture vessel that is set in the drying stage.

Given that the exhaust temperature from the engine 112 can be near 900° F., and given the characteristics of the $N_2$-turbocharger 604 and the $N_2$ heat exchanger ($N_2$ HX) 602, it is possible to create a hot dry gas 622 that is mostly $N_2$ gas and has a temperature that is greater than 600° F. for the drying process. The drying process may be used to dry the media of the capture vessel after wet regeneration. For example, in order for a capture vessel to again be able to sufficiently adsorb $CO_2$, the water adsorbed during wet regeneration should be released from the capture vessel. The drying process may be used to release the water as water vapor via evaporation and moving the water vapor out of the capture vessel. Importantly, the $N_2$-turbocharger 604 may be driven exclusively or mostly via engine waste heat (e.g., from the hot exhaust from the engine 112). As a result, little or no mechanical or electrical power is needed to sustain the drying process.

While the $N_2$ heat exchanger ($N_2$ HX) 602 and the $CO_2$ heat exchanger ($CO_2$ HX) 118 are shown in series, in some implementations, the exhaust flow from the engine could be split. As result, the $N_2$ heat exchanger ($N_2$ HX) 602 and the $CO_2$ heat exchanger ($CO_2$ HX) 118 could be provided in parallel, resulting in both the $N_2$ heat exchanger ($N_2$ HX) 602 and the $CO_2$ heat exchanger ($CO_2$ HX) 118 providing a respective hot gas (e.g., a $CO_2$ turbo hot gas and an $N_2$ turbo hot gas) at temperatures greater than 600° F.

In some implementations, a number of capture vessels need not align with a number of stages. For example, in the carbon capture system 600, three capture vessels TS3, TS4, and TS5 are used for the four-stage adsorption, regeneration, drying, and cooling process. As one capture vessel performs adsorption during a process time slot (e.g., during a batch), a second capture vessel can perform regeneration (e.g., wet regeneration) during the same process time slot. In addition, a third capture vessel can perform both drying and cooling during the same process time slot, with dying being performed during a first portion of the process time slot and cooling performed during a second portion of the process time slot. In some implementations, four capture vessels may be provided, with each capture vessel being allocated one of the four stages during a process time slot. In some implementations, five or six capture vessels may be provided with additional In, T, C, H, D, and X valving and manifolds. In addition, two capture vessels may be used simultaneously for a process that takes longer, such as adsorption or cooling, and only a single capture vessel used for a shorter process, such as regeneration or drying.

Valves HN2 and CN2 may allow the carbon capture system 600 to deliver either hot dry gas 622 for the drying process (valve HN2 open and valve CN2 closed) or deliver a cool mixture of $N_2$ and air (e.g., cooled $N_2$ gas 630) for the cooling process (valve CN2 open and valve HN2 closed). Thus, even if the number of capture vessels is three, the four stages can be accomplished, for example, by splitting a drying time and a cooling time for a single capture vessel.

Cooling

The cooling stage may be performed according to FIG. 1. Alternatively, the cooling stage may be performed according to FIG. 6E. In FIG. 6E, the dry $N_2$ gas 624 that exits the capture vessel that is set in the adsorbing stage (e.g., capture vessel TS3) is circulated through the valve $CN_2$, through a chiller 626 for further cooling, though a cooler tank 628 by the TSA screw/blower 126 and to one of the capture vessels TS3, TS4, or TS5. In the cooling stage, valve HN2 is closed and valve CN2 is open to redirect the dry $N_2$ gas 624 for cooling instead of for drying. The DAC inlet fan 612 is used to introduce outside air into the $N_2$ flow. Thus, cooled $N_2$ gas 630, that is mixed with outside air, is provided from the cooler tank 628, to the inlet 618, and passed through the capture vessel that is set in the cooling stage (e.g., capture vessel TS5) and exits though an exit valve (e.g., valve T5X).

Figure 7:
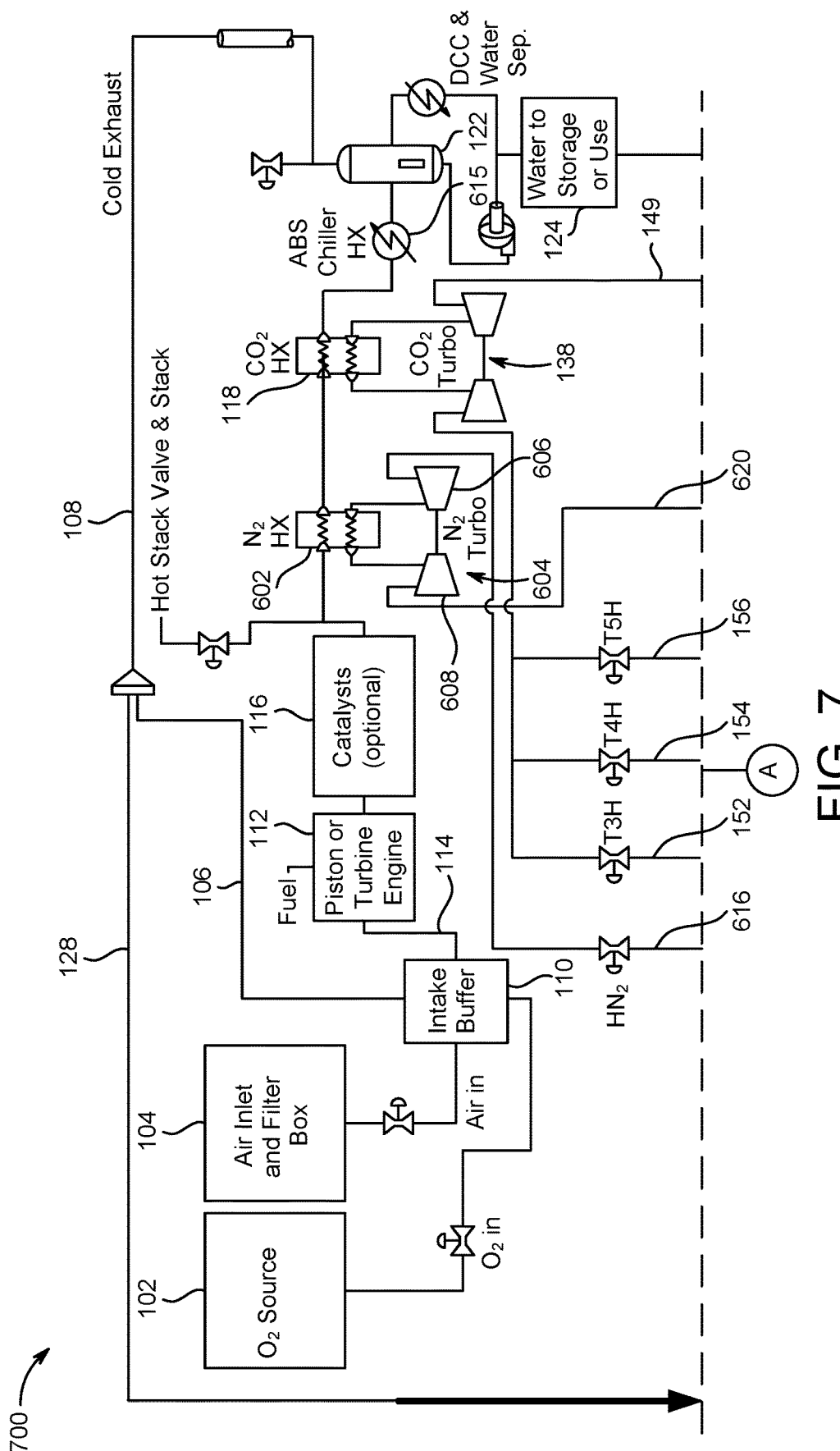
FIG. 7 illustrates a carbon capture system according to one or more implementations.
Figure 7:
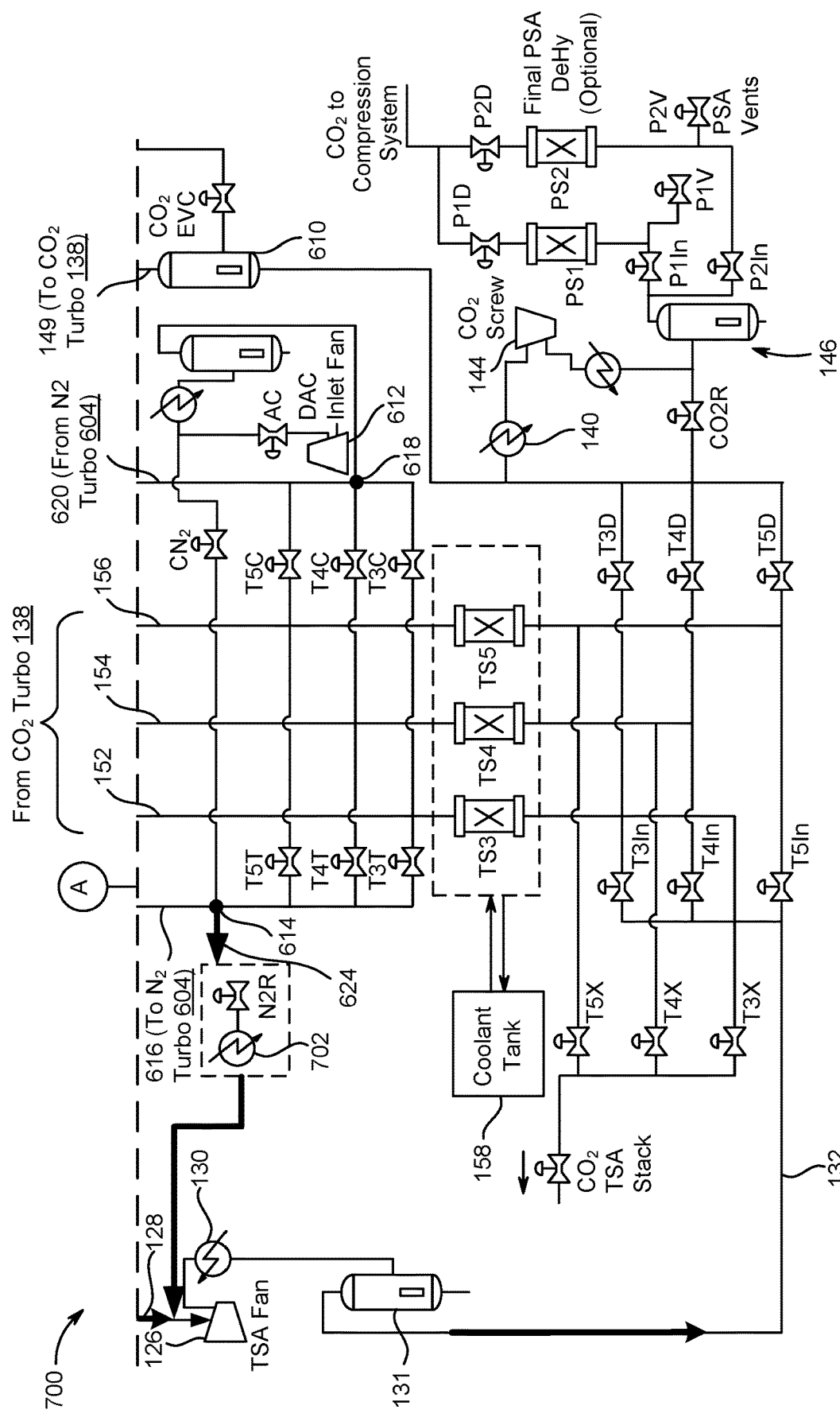

FIG. 7 illustrates a carbon capture system 700 according to one or more implementations. The carbon capture system 700 is similar to the carbon capture system 600 described in connection with FIGS. 6A-6E, with the exception that a chiller 702 (e.g., a heat exchanger) and a valve N2R ($N_2$ recycle) are provided between the TSA path 128 and the adsorption outlet 614 that is connected to valves T3T, T4T, T5T, HN2, CN2.

The SCC exhaust loop may be used to increase $CO_2$ concentration for an adsorption bed (e.g., for capture vessels TS3, TS4, and TS5) via exhaust recirculation. The SCC has the purpose of concentrating the $CO_2$ in the exhaust, to improve capture performance. In general, higher $CO_2$ concentration reduces a size of capture equipment. There are limits, and in some cases, with higher water loading and/or with higher $CO_2$ percentages like one might have in some reciprocating engines, a combination of heat of adsorption of water and heat of adsorption of $CO_2$ can result in higher than desired temperatures in a bed (e.g., in a capture vessel) during the $CO_2$ adsorption process. In these cases, reducing a bed temperature during adsorption will improve performance.

Valve N2R may be provided to divert some of the dry $N_2$ gas 624 (e.g., the depleted flue gas) generated during $CO_2$ adsorption from the capture vessel to the TSA screw/blower 126 in order to dilute the cold exhaust flowing into the TSA screw/blower 126 from the TSA path 128. The dry $N_2$ gas 624, which is substantially depleted of $CO_2$, is added to the cold exhaust, which results in an amount of $CO_2$ by volume to be decreased at the adsorption inlet 132. Thus, the dry $N_2$ gas 624 may be used as a diluent gas (e.g., a cold diluent gas). As a result, the cold exhaust flowing into the adsorption inlet 132 may be referred to as a diluted exhaust gas or diluted flue gas, where the amount of $CO_2$ has been diluted by a recycling of the dry $N_2$ gas 624 that is created during the adsorption stage.

For example, the dry $N_2$ gas may flow from the adsorption outlet 614, to the N2R valve, and may cooled by the chiller 702 to produce the cold diluent gas. The dry $N_2$ gas 624 may be returned to the adsorption inlet 132, artificially reducing a concentration of $CO_2$ to create diluted flue gas in adsorption inlet 132 and lowering a temperature of a capture vessel during $CO_2$ adsorption. Lowering a temperature of a capture vessel during $CO_2$ adsorption aids in the $CO_2$ adsorption.

The $CO_2$ concentration may be increased via exhaust gas recirculation in the SCC exhaust loop, or the $CO_2$ concentration may be reduced with $N_2$ recirculation via valve N2R. In this way, the carbon capture system 700 has the ability to get to achieve an optimum $CO_2$ concentration for carbon capture. For example, gas turbines may require a $CO_2$ concentration increase, since the gas turbines run on around 3% $CO_2$, while some piston engines or gas turbines with heavy supplemental firing, may require a reduction in the $CO_2$ concentration. The SCC exhaust loop and/or the N2 recirculation loop via value N2R may be used to control the $CO_2$ concentration at the capture vessels TS3, TS4, and TS5. The use of the SCC exhaust loop and/or the N2 recirculation loop is optional.

Four-Stage Process Flow

Figure 8:
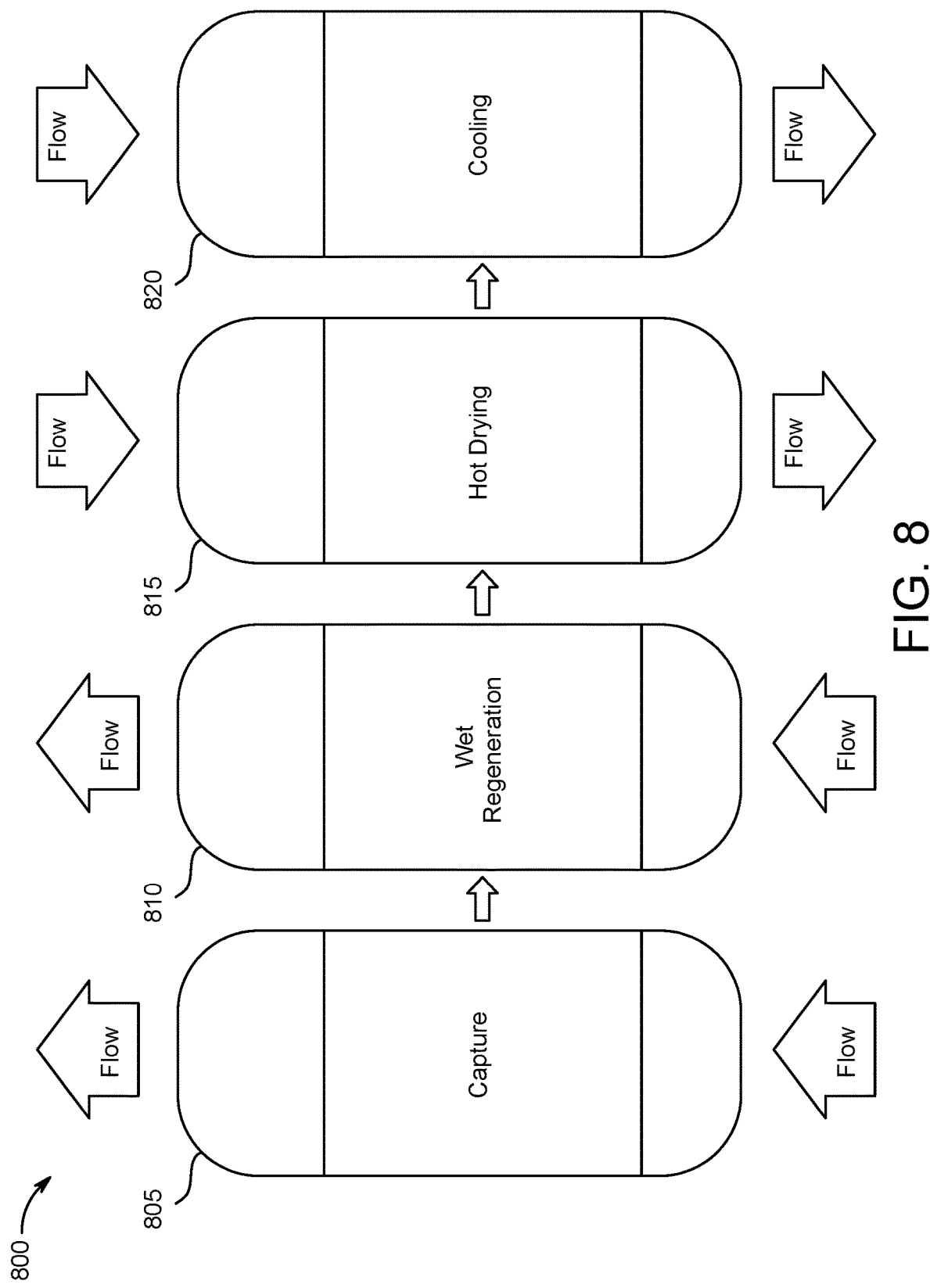
FIG. 8 shows a four-stage process flow of a $CO_2$-TSA process in a capture vessel according to one or more implementations.

FIG. 8 shows a four-stage process flow 800 of a $CO_2$-TSA process in a capture vessel according to one or more implementations. The four-stage process flow 800 includes a capture stage 805 (e.g., a $CO_2$ adsorption stage), followed by a wet regeneration stage 810, followed by a hot drying stage 815, and followed by a cooling stage 820. The four-stage process flow 800 may be implemented by the carbon capture system 600 or the carbon capture system 700.

An addition of water vapor purge (e.g., the water vapor purge gas) via the $CO_2$ evaporative cooler ($CO_2$ EVC) 610 to the regeneration process (e.g., wet regeneration) may result in changes to the $CO_2$-TSA process described in connection with FIGS. 1 and 3. First, a direction of flowrate or flow in the capture vessel may be switched from top-down to bottom-up during regeneration. A change in direction flowrate to a bottom-up direction may improve regeneration because most of the water that is adsorbed into the media of the capture vessel will be adsorbed into a bottom portion of the bed, creating a hot zone at the bottom portion of the bed that heats the gas flowing to the rest of the bed. This may also make drying the bed easier.

In cases where an amount of water vapor in the water vapor purge gas is significant, a drying process may be required. For example, drying is needed for designs that provide continuous water use in the $CO_2$ evaporative cooler ($CO_2$ EVC) 610, but may also be used for designs that only use a brief purge of water vapor late in regeneration. While some drying would occur using the warm depleted exhaust gas (mostly $N_2$) (e.g., cooled $N_2$ gas 630), and some drying would even occur using air, the best drying performance will exist with use of the hot dry gas 622, as shown in FIG. 6D.

Structure of $CO_2$ Evaporative Cooler ($CO_2$ EVC)

Figure 9:
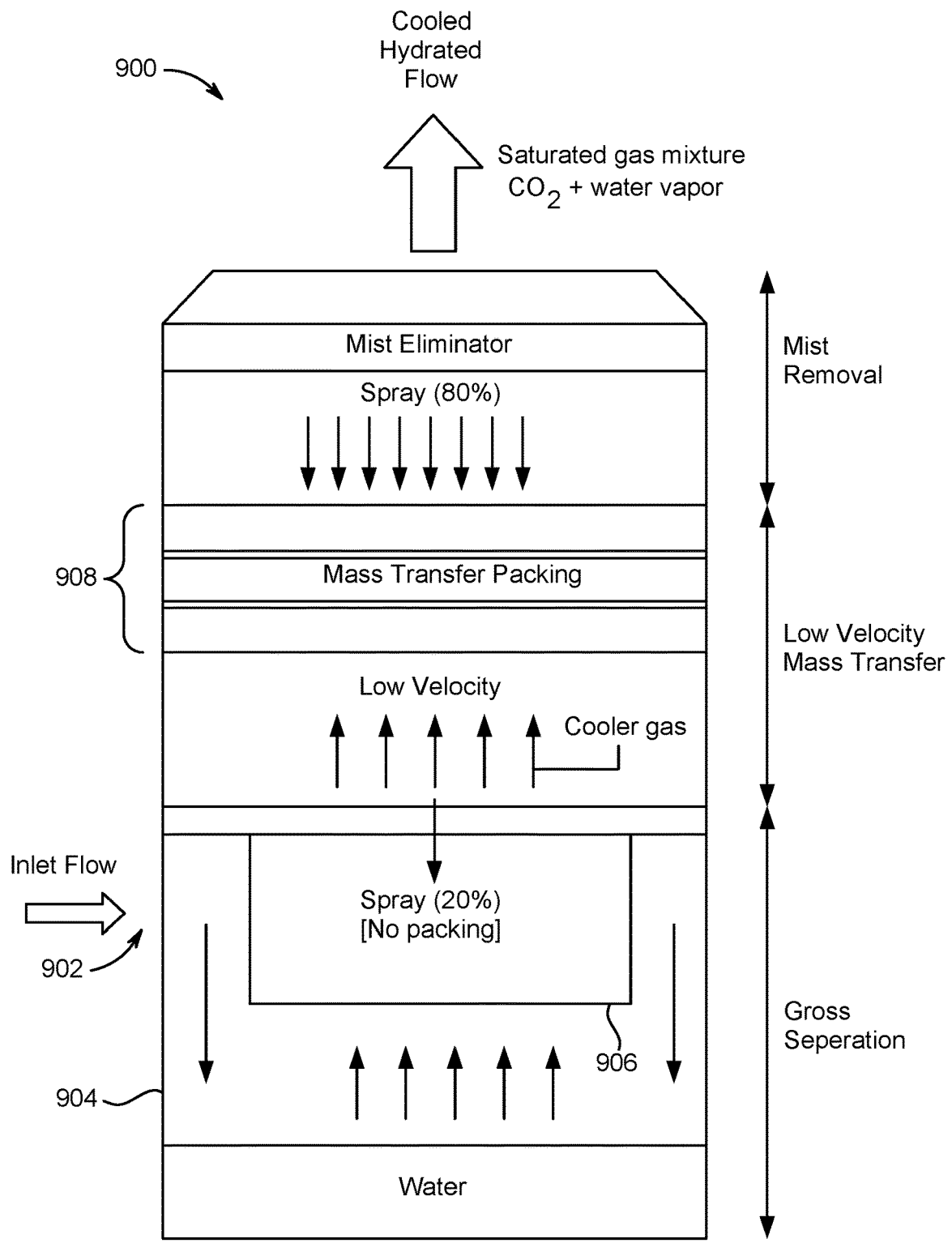
FIG. 9 shows a structure of a $CO_2$ evaporative cooler according to one or more implementations.

FIG. 9 shows a structure of a $CO_2$ evaporative cooler ($CO_2$ EVC) 900 according to one or more implementations. The $CO_2$ evaporative cooler ($CO_2$ EVC) 900 may correspond to the $CO_2$ evaporative cooler ($CO_2$ EVC) 610 described in connection with FIGS. 6A-6E. The $CO_2$ evaporative cooler ($CO_2$ EVC) 900 may be a direct contact cooler (DCC). Additionally, the gas-liquid separator 122, which may also be a DCC, may have a similar structure.

The $CO_2$ evaporative cooler ($CO_2$ EVC) 900 may include an inlet 902 for receiving the inlet $CO_2$ gas described in connection with FIG. 6C. The inlet $CO_2$ gas from the $CO_2$ regeneration flows around a skirt 904, into an area 906 where a percentage of cooling water can optionally be sprayed by water from the water storage tank 124, reducing a temperature of the inlet $CO_2$ gas, akin to a desuperheater. The cooler gas then flows through a mass transfer packing 908, where additional water spray above creates a counter flow effect. The mass transfer packing 908 may function as a buffer that is made of stainless steel, plastic, or ceramic (e.g., ceramic mass transfer media of inch ceramic balls). As a result, a temperature of the saturated gas mixture of $CO_2$ and water vapor that exits from a top of the $CO_2$ evaporative cooler ($CO_2$ EVC) 900 can be quite low relative to the inlet $CO_2$ gas. For example, in operation, with the water spray provided at 100° F., a 600° F. $CO_2$ that enters the inlet 902 can be cooled to near 100° F. by the water spray at the output of the $CO_2$ evaporative cooler ($CO_2$ EVC) 900, where the saturated gas mixture of $CO_2$ and water vapor will leave the $CO_2$ evaporative cooler ($CO_2$ EVC) 900.

As indicated above, FIG. 9 is provided as an example. Other examples may differ from what is described with regard to FIG. 9.

INDUSTRIAL APPLICABILITY

The described implementations significantly reduce the carbon footprint of gas turbine and piston engine operations as a result of achieving a high $CO_2$ capture percentage, generally greater than 95%, with the combination of techniques disclosed herein.

The greenhouse gas problem is not just $CO_2$, it includes gases such as NOx and $SO_x$ that make part of acid rain and attack the ozone layer, as well as unburnt hydrocarbon (methane and non-methane) and any partial products of combustion, like aldehydes. Carbon monoxide, while not commonly considered a greenhouse gas, is a regulated pollutant that converts in the atmosphere quickly to form $CO_2$, and thus must also be addressed.

Other capture techniques, like conventional amine, do not address most of these gases. Other mole sieve capture techniques could address these gases, but gases like NOx will go into the bed, but will not come out (in a PSA or VPSA process) resulting in reduced bed performance over time. The $CO_2$-TSA processes described herein have a capability to also capture CO, HC, NOx with an appropriate media choice. However, if CO, HC, NOx gases are captured, CO, HC, NOx must be tolerable as contaminants in the $CO_2$. CO and HC are allowed, but frequently NOx and $SO_x$ are not allowed at high concentration, since they could combine with other gases and create a corrosive mixture.

In FIGS. 6A-6E, catalysts in the optional catalysts and supplemental combustion (block 116) may be optionally used after the engine 112. Catalysts at block 116 and a DCC (e.g., gas-liquid separator 122) may be used to capture NOx and $SO_x$ upstream of the capture vessels TS3, TS4, and TS5. In particular, oxidation catalysts, which would convert CO to $CO_2$, and HC to $CO_2$ and $H_2O$, are low cost and may be implemented. A selective catalytic reduction (SCR) process may be used for NOx control, usually using urea or ammonia to reduce the NOx. As part of SCR implementation, often oxidation catalysts are used to convert NO gas (typically 85% of engine NOx output) to $NO_2$ gas. A larger oxidation catalyst would enable a larger conversion percentage of NO gas to $NO_2$ gas, as well as conversion from $SO_2$ to $SO_3$. In exhausts, these conversions are unimportant, unless they are pre-requisites to good SCR operation, but in the instance of this disclosure, and of the SCC in general, the exhaust is water washed in the gas-liquid separator 122 (e.g., DCC), which may have a similar construction to the $CO_2$ evaporative cooler ($CO_2$ EVC) 900, but may use a non-ceramic high void area mass transfer packing (e.g., stainless steel or plastic). An artifact of the SCC process is exhaust scrubbing, resulting in NOx that would normally be emitted as a gas being scrubbed out into the condensate. The amount of NOx reduction, pre-capture, will be a function of the conversion efficiency of NO to $NO_2$ in the catalyst, but conversion efficiencies of over 90% are possible, resulting in about a 10 times reduction in NOx into the capture system, and NOx release into the atmosphere, or into the $CO_2$ product in lieu of release into the atmosphere.

The net result of the carbon capture systems and methods described herein to the $CO_2$-TSA process is a reduction in $CO_2$ emissions, which could exceed 95%, not including the $CO_2$ captured from air as part of the cooling process, and reductions in other engine emissions by up to a factor of 10.

A use of activated carbon vs. a conventional mole sieve will reduce the heat of adsorption related to water and can also limit the number of pollutants captured in cases where the $CO_2$ purity requirements are not tolerant of the level of pollutants. Activated carbon can be used as a substitute for mole sieve, or as a blend with mole sieve within the present disclosure. In other words, activated carbon may be used in the capture vessel TS3, TS4, and TS5, and/or in a vessel of the $CO_2$ evaporative cooler ($CO_2$ EVC) 610. In some implementations, the carbon capture system 600 may be designed without a mole sieve.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A method of performing a carbon dioxide ($CO_2$)-thermal swing adsorption (TSA) process for carbon capture, the method comprising:
    dynamically configuring a carbon capture system comprising a plurality of capture vessels, arranged in parallel, into different fluid path configurations to perform the $CO_2$-TSA process,
        wherein the $CO_2$-TSA process includes a cyclical sequence for each capture vessel of the plurality of capture vessels, and
        wherein the cyclical sequence includes a $CO_2$ capture stage, followed by a wet regeneration stage, followed by a drying stage, followed by a cooling stage;

performing the $CO_2$ capture stage for a first capture vessel of the plurality of capture vessels;

performing the wet regeneration stage for a second capture vessel of the plurality of capture vessels in parallel with the $CO_2$ capture stage of the first capture vessel; and performing the drying stage for a third capture vessel of the plurality of capture vessels in parallel with the $CO_2$ capture stage of the first capture vessel.

2. The method of claim 1, further comprising:

performing the cooling stage for the third capture vessel in parallel with the $CO_2$ capture stage of the first capture vessel, wherein performing the drying stage for the third capture vessel is performed during a first portion of the $CO_2$ capture stage of the first capture vessel, wherein performing the cooling stage for the third capture vessel is performed during a second portion of the $CO_2$ capture stage of the first capture vessel, and wherein the first portion of the $CO_2$ capture stage precedes the second portion of the $CO_2$ capture stage.

3. The method of claim 2, wherein performing the $CO_2$ capture stage for the first capture vessel in parallel with performing the cooling stage for the third capture vessel includes configuring the carbon capture system into a first fluid path configuration such that:

the first capture vessel receives an exhaust gas comprising $CO_2$ and nitrogen ($N_2$) and converts the exhaust gas into a first $N_2$ gas by adsorbing $CO_2$ from the exhaust gas, the first $N_2$ gas is cooled via a heat exchange with a coolant to produce a cooled gas, and the third capture vessel receives the cooled gas, wherein capture media of the third capture vessel is cooled via the cooled gas.

4. The method of claim 3, wherein performing the $CO_2$ capture stage for the first capture vessel in parallel with performing the drying stage for the third capture vessel includes configuring the carbon capture system into a second fluid path configuration such that:

the first capture vessel receives an exhaust gas comprising $CO_2$ and nitrogen ($N_2$) and converts the exhaust gas into a first $N_2$ gas by adsorbing $CO_2$ from the exhaust gas, the first $N_2$ gas is heated via a heat exchange with a hot exhaust gas to produce a first heated $N_2$ gas, and the third capture vessel receives the first heated $N_2$ gas, wherein capture media of the third capture vessel is dried via the first heated $N_2$ gas by expelling adsorbed water from the capture media of the third capture vessel via evaporation.

5. The method of claim 1, wherein performing the $CO_2$ capture stage for the first capture vessel in parallel with performing the drying stage for the third capture vessel includes configuring the carbon capture system into a first fluid path configuration such that:

the first capture vessel receives an exhaust gas comprising $CO_2$ and nitrogen ($N_2$) and converts the exhaust gas into a first $N_2$ gas by adsorbing $CO_2$ from the exhaust gas, the first $N_2$ gas is heated via a heat exchange with a hot exhaust gas to produce a first heated $N_2$ gas, and the third capture vessel receives the first heated $N_2$ gas, wherein capture media of the third capture vessel is dried via the first heated $N_2$ gas by expelling adsorbed water from the capture media of the third capture vessel via evaporation.

6. The method of claim 5, wherein configuring the carbon capture system into the first fluid path configuration includes recycling a portion of the first $N_2$ gas into a stream of the exhaust gas to dilute a $CO_2$ concentration of the exhaust gas.

7. The method of claim 5, wherein the hot exhaust gas is a source of the exhaust gas received by the first capture vessel.

8. The method of claim 5, wherein performing the $CO_2$ capture stage for the first capture vessel in parallel with performing the wet regeneration stage for the second capture vessel includes configuring the carbon capture system into a second fluid path configuration such that:

the second capture vessel produces a $CO_2$ stream based on a release of adsorbed $CO_2$ from capture media of the second capture vessel, receives a mixed stream of $CO_2$ and water vapor derived from the $CO_2$ stream, adsorbs water from the mixed stream of $CO_2$ and water vapor to release the adsorbed $CO_2$ to produce the $CO_2$ stream, and outputs the $CO_2$ stream, wherein the adsorbed $CO_2$ is adsorbed by the capture media of the second capture vessel during a respective $CO_2$ capture stage.

9. The method of claim 1, wherein performing the $CO_2$ capture stage for the first capture vessel in parallel with performing the wet regeneration stage for the second capture vessel includes configuring the carbon capture system into a fluid path configuration such that:

the second capture vessel produces a $CO_2$ stream based on a release of adsorbed $CO_2$ from capture media of the second capture vessel, receives a mixed stream of $CO_2$ and water vapor derived from the $CO_2$ stream, adsorbs water from the mixed stream of $CO_2$ and water vapor to release the adsorbed $CO_2$ to produce the $CO_2$ stream, and outputs the $CO_2$ stream, wherein the adsorbed $CO_2$ is adsorbed by the capture media of the second capture vessel during a respective $CO_2$ capture stage.

10. The method of claim 9, wherein performing the $CO_2$ capture stage for the first capture vessel in parallel with performing the wet regeneration stage for the second capture vessel includes adding water vapor to the $CO_2$ stream to produce the mixed stream of $CO_2$ and water vapor.

11. The method of claim 9, wherein performing the wet regeneration stage for the second capture vessel includes:

injecting auxiliary $CO_2$ into the $CO_2$ stream during an initial time interval of the wet regeneration stage;

siphoning off a portion of the $CO_2$ stream during a remaining time interval of the wet regeneration stage; and storing the portion of the $CO_2$ stream for a next regeneration stage of the $CO_2$-TSA process.

* * * * *